(12) United States Patent
Leavy et al.

(10) Patent No.: US 9,619,651 B1
(45) Date of Patent: Apr. 11, 2017

(54) PATTERN GENERATION, IDS SIGNATURE CONVERSION, AND FAULT DETECTION

(75) Inventors: Penny C. Leavy, Monte Sereno, CA (US); Michael Gregory Hoglund, Monta Sereno, CA (US); Jonathan Walter Gary, Portland, OR (US); Riley Dennis Eller, Seattle, WA (US)

(73) Assignee: TRUSTWAVE HOLDINGS, INC., Chicago, IL (US)

( * ) Notice: Subject to any disclaimer, the term of this patent is extended or adjusted under 35 U.S.C. 154(b) by 0 days.

(21) Appl. No.: 12/590,334

(22) Filed: Nov. 4, 2009

Related U.S. Application Data

(63) Continuation of application No. 11/701,181, filed on Jan. 31, 2007, now Pat. No. 7,620,851, which is a continuation of application No. 10/087,000, filed on Feb. 28, 2002, now Pat. No. 7,185,232.

(60) Provisional application No. 60/272,486, filed on Feb. 28, 2001.

(51) Int. Cl.
| | |
|---|---|
| *G06F 11/00* | (2006.01) |
| *G06F 21/57* | (2013.01) |
| *G06F 21/54* | (2013.01) |
| *G06F 11/36* | (2006.01) |
| *G06F 21/52* | (2013.01) |

(52) U.S. Cl.
CPC ........ *G06F 21/577* (2013.01); *G06F 11/3672* (2013.01); *G06F 21/52* (2013.01); *G06F 21/54* (2013.01)

(58) Field of Classification Search
CPC ...... G06F 11/3672; G06F 21/52; G06F 21/54; G06F 21/577

USPC ...................... 714/4, 41, 43; 726/22, 23, 25
See application file for complete search history.

(56) References Cited

U.S. PATENT DOCUMENTS

| | | |
|---|---|---|
| 4,759,019 A | 7/1988 | Bentley et al. |
| 4,999,837 A | 3/1991 | Reynolds et al. |
| 5,046,068 A | 9/1991 | Kubo et al. |
| 5,072,447 A | 12/1991 | Perloff et al. |
| 5,193,178 A | 3/1993 | Chillarege et al. |
| 5,428,624 A | 6/1995 | Blair et al. |

(Continued)

OTHER PUBLICATIONS

Green et al. "Analysis Techniques for Detecting Coordinated Attacks and Probes." Proc. of the Workshop on Intrusion Detection and Network Monitoring. Santa Clara, CA, USA, Apr. 9-12, 1999.*

(Continued)

*Primary Examiner* — Philip Guyton
(74) *Attorney, Agent, or Firm* — Hanley, Flight & Zimmeman, LLC.

(57) ABSTRACT

A method of testing a target in a network by fault injection, includes: defining a transaction baseline; modifying at least one of an order and a structure of the transaction baseline to obtain a modified transaction with malformed grammar; and transmitting the modified transaction to a target. The method may further include, receiving a feedback from the target to determine fault occurrence. An apparatus for testing a target in a network by fault injection, includes: a driver configured to generate patterns, where a pattern can generate a plurality of packets for transmission to the target, the pattern being represented by an expression with a literal string and a wild character class; and a network interface coupled to the driver and configured to transmit and receive network traffic.

29 Claims, 14 Drawing Sheets

(56) References Cited

U.S. PATENT DOCUMENTS

| | | | |
|---|---|---|---|
| 5,440,723 | A | 8/1995 | Arnold et al. |
| 5,485,409 | A | 1/1996 | Gupta et al. |
| 5,892,903 | A | 4/1999 | Klaus |
| 6,233,073 | B1 * | 5/2001 | Bowers et al. ............... 398/16 |
| 6,279,113 | B1 * | 8/2001 | Vaidya ............... 726/23 |
| 6,311,278 | B1 | 10/2001 | Raanan et al. |
| 6,477,651 | B1 * | 11/2002 | Teal ............... 726/23 |
| 6,487,666 | B1 | 11/2002 | Shanklin et al. |
| 6,560,720 | B1 | 5/2003 | Chirashnya et al. |
| 6,574,737 | B1 | 6/2003 | Kingsford et al. |
| 6,584,569 | B2 | 6/2003 | Reshef et al. |
| 6,609,205 | B1 | 8/2003 | Bernhard et al. |
| 6,654,914 | B1 | 11/2003 | Kaffine et al. |
| 6,988,208 | B2 | 1/2006 | Hrabik et al. |
| 6,996,845 | B1 | 2/2006 | Hurst et al. |
| 2005/0251570 | A1 | 11/2005 | Heasman et al. |

OTHER PUBLICATIONS

Ghosh et al. "An Automated Approach for Identifying Potential Vulnerabilities in Software." IEEE. Symp. on Sec. and Priv. May 3-6, 1998, abstract only.*

"An Automated Approach for Identifying Potential Vulnerabilities in Software"by A. Ghosh, et al.,IEEE Symp. on Sec. & Priv. May 3-6, 1998, pp. 104-114.

"Towards Analysing Security-Critical Software During Development" by A. Ghosh, et al., Tech. Report RSTR-96-023-01, RST Corp., Dec. 1996. Total pp. 14.

"An Approach for Certifying Security in Software Components" by A. Ghosh, et al. Proc. 21st NIST-NCSC Nat. Info. Systems Conf., Oct. 6-9, 1998. Total pp. 7.

"Vulnerability Testing of Software System Using Fault Injection" by W. Du, et al. Report Coast TR98-02, Dept. of Comp. Sci., Purdue University, 1998. Total pp. 20.

"NT Web Technology Vulnerabilities", rain.forest.puppy, Phrack Magazine, vol. 8, Iss. 54, Dec. 25, 1998. Article 8 of 12. Total pp. 8.

"Program-Probe Web for Insecure Perl Installations", perl_cgi_pl.txt, Mar. 28, 1996. Total pp. 3.

"Prograrn-CgiScan v 1.5", cgi-scan_c.txt., Feb. 1999. Total pp. 3.

"SPHINX: A Framework for Creating Personal, Site-Specific Web Crawlers" by R. Miller, et al., Apr. 1998. http://www.cs.cmu.edu/~rcm/papers/www7/www7.html.

"The World Wide Web Security FAQ v. 1.9.0" by L. Stein. Jun. 30, 1998. [webpages][online]: Retrieved from the internet: http://www.per..com/doc/FAQ.

"Security NNOV advisory-The Bat! directory traversal" (public release). [webpages][online]. Retrieved from the internet: http://archive.cert.uni.de/archive/bugtraq/2001/01.

"SQL Injection" by K. Spelt. Retrieved on Sep. 14, 2007. Retrieved from the internet: http://www.spidynamics.com/papers/SQLInjectionWhitePaper.pdf. Total pp. 35.

Advisory: NT ODBC Remote Compromise by M. Astley, et al. [webpages][online]. Retrieved from the internet: http://www.wiretrip.net/rfp/txt/rfp9901.txt.

Stites & Harbison PLLC, Mar. 29, 2007. Total pp. 8.

Ptacek et al. "Insertion, Evasion, and Denial of Service: Eluding Network Intrusion Detection," Secure Networks, Inc., Jan. 1998, http://cs.unc.edu/~fabian/course_papers/PtacekNewsham98.pdf, 63 pages. Document available in U.S. Appl. No. 11/701,181.

Gary, Jon, "Multiple levels of de-synchronization and other concerns with testing an IDS system," Aug. 11, 2000, retrieved from, "http://www.securityfocus.com/prinUinfocus/1204" Document available in U.S. Appl. No. 11/701,181.

Maiffret, Marc, "%u encoding IDS bypass vulnerability (UTF)," http://www.securiteam.com/securitynews/5OP011P5FQ.html, Sep. 6, 2001, 3 pages. Document available in U.S. Appl. No. 11/701,181.

"campas cgi hole" retrieved from http:///www.hoobie.net/security/exploits/hacking/campus_cgi_hole.txt on Feb. 13, 2007 Document available in U.S. Appl. No. 11/701,181.

"H-48: Internet Information Server Vulnerability" retrieved from http://ciac.11n1.gov/ciac/bulletins/h-48.shtml on Feb. 13, 2007. Document available in U.S. Appl. No. 11/701,181.

* cited by examiner

PATTERN GENERATION, IDS SIGNATURE CONVERSION, AND FAULT DETECTION

CROSS REFERENCE TO RELATED APPLICATION

This application is a continuation of U.S. patent application Ser. No. 11/701,181, filed Jan. 31, 2007, now U.S. Pat. No. 7,620,851 which is a continuation of U.S. patent application Ser. No. 10/087,000, filed Feb. 28, 2002 now U.S. Pat. No. 7,185,232. U.S. patent application Ser. No. 11/701,181 and U.S. Pat. No. 7,185,232, are hereby fully incorporated herein by reference. Benefit of all earlier filing date is claimed for all common subject matter.

This application claims the benefit of and priority to U.S. Provisional Application No. 60/272,486, by common inventors, Penny C. Leavy, Michael Gregory Hoglund, Jonathan Walter Gary, and Riley Dennis Eller, filed Feb. 28, 2001, and entitled "SYSTEM AND METHOD FOR GENERATING AND ANALYZING NETWORK TRAFFIC". Application No. 60/272,486 is fully incorporated herein by reference.

TECHNICAL FIELD

This disclosure relates generally to fault detection and testing methods, and more particularly to an apparatus and methods for detecting and testing vulnerabilities in a system-under-test.

BACKGROUND

Security attacks are becoming more prevalent and costly. These attacks often lead to losses of critical information, decreases in productivity, and negative effects on corporate reputation. For example, various worms were able to spread through the Internet in 2001 and infect over 850,000 servers, resulting in the disruption of operations of the affected businesses and organizations. While traditional security devices, such as firewalls and intrusion detection systems (IDS), are effective at the network layer, these devices are unable to provide effective security in the application layer.

Additionally, networks have become more critically complex. It is difficult to test the myriad scripts and protocols even on a small business network, let alone on networks that span nationally and globally. Thus, creating tests for extremely complex protocols can be complex, costly, and, in some instances, not feasible.

Additionally, due to security, virus, and other issues critically affecting networks, there is an overwhelming market need for network and software application risk management products.

Accordingly, there is a need for an apparatus and method that provide effective detection and testing of vulnerabilities and that will overcome the deficiencies mentioned above.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Figure 1:
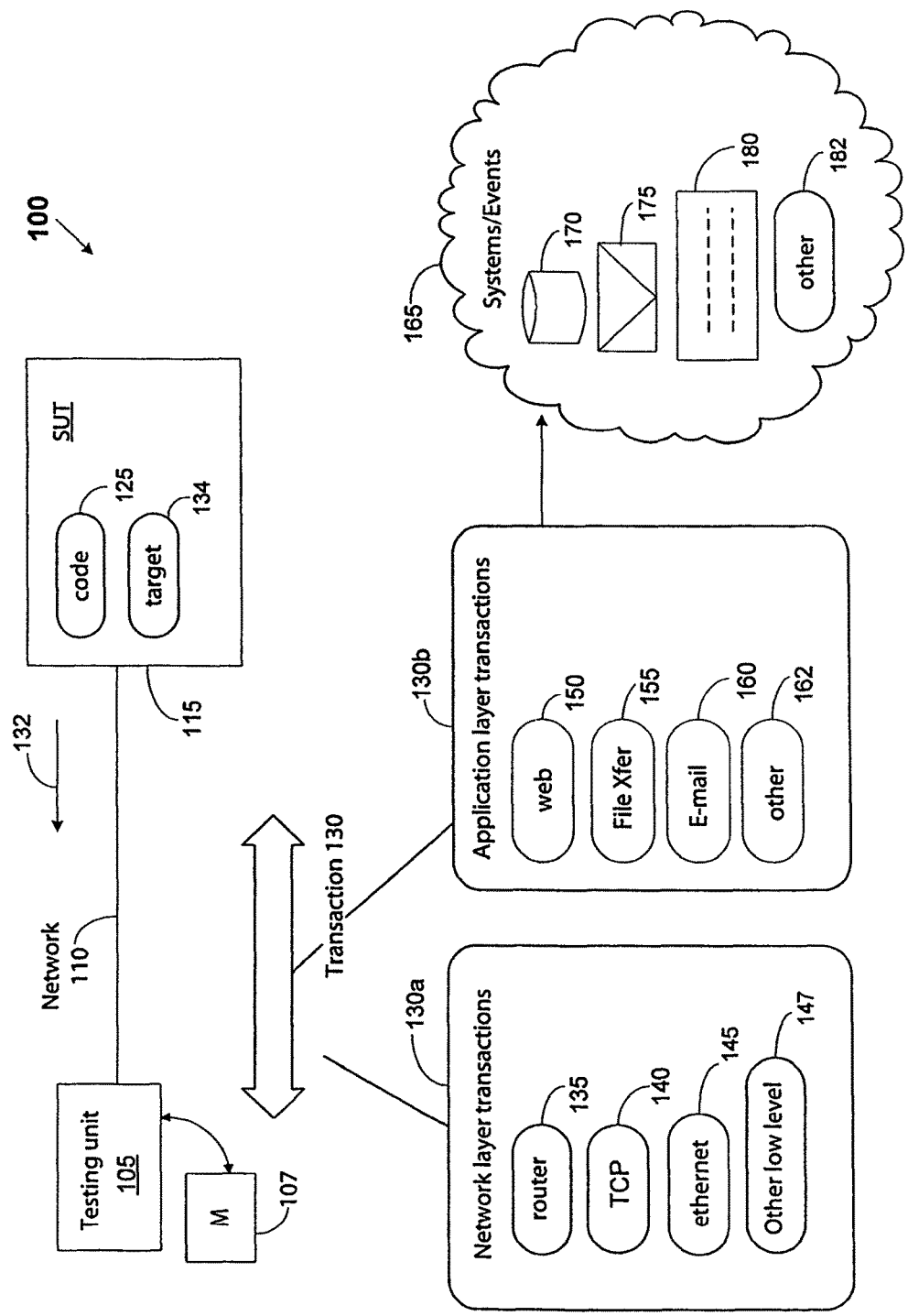
FIG. 1 is a block diagram of network system that can implement an embodiment of the invention.

FIG. 1 is a block diagram of a network system 100 that can implement a specific embodiment of the invention. Of course, the illustrated network system 100 is provided for example purposes only, and other systems or topologies may be used within the scope of the invention. A testing unit 105 may be coupled to a network (or path) 110. One example of a testing unit 105 is of the type commercially available from Cenzic, Inc. (formerly ClickToSecure, Inc.), Campbell, Calif., under the product name HAILSTORM™. At least one system-under-test (SUT) 115 may be coupled to the network 110 and can accept transactions (network input) 130 from, for example, the testing unit 105. Code 125 typically acts upon a transaction 130. As described below, the testing unit 105 can transmit the transactions 130 and can receive feedback 132 to determine if there is a fault occurrence in at least one target 134 (or code 125) in the SUT 115.

Target 134 can represent a complete collection of code 125, a partial collection of code 125, or a combination of components or devices which are effected by code 125.

Transactions 130 that occur over network 110 between network elements (e.g., SUT 115) include network layer transactions 130a and application layer transactions 130b. Network layer transactions 130a involve, for example, router information 135, TCP information 140, Ethernet information 145, and/or other low level transaction information 147. Application layer transactions 130b involve, for example, web information 150, file transfer information 155, electronic mail information 160, and/or other information 162 that is an aggregate of low level transactions. A given application layer transaction 130b may exercise particular systems/events 165 such as, for example, database systems 170, electronic mail systems 175, and/or logging events 180, and/or other systems/events 182.

Figure 2:
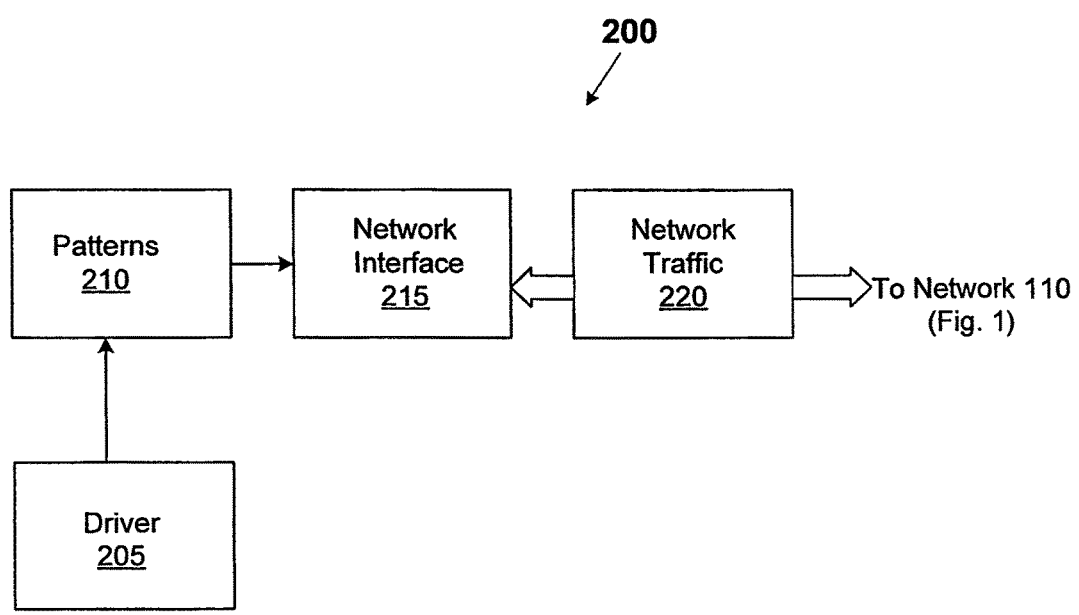
FIG. 2 is a block diagram of a network traffic generation system in accordance with an embodiment of the invention.

FIG. 2 is a block diagram of a system 200 in testing unit 105 according to a specific embodiment of the invention. A driver 205 can generate packets based on patterns 200, where a single pattern can be responsible for generating a plurality of packets. A network interface 215 permits packets to be transmitted to and received from the network 110. Thus, network traffic 220 can be transmitted by and received by the network interface 215.

Fault-Inducing Transaction Representation

The precise permutation of a transaction that induces a fault has a concrete form, represented by the current iteration of the overall pattern. The output of the pattern for this iteration produces the associated fault. Thus, the output becomes an important event in the SUT 115 in that it causes a fault. Thus, there is value in examining the network for the given fault pattern. A pattern describes a set of known strings of data interjected with fault-inducing sub-fields. The precise format of the pattern at a given permutation or iteration can be represented by an expression of the form as shown in Table A.

TABLE A ([string literal] | [wildcard character class])

In other words, as an example, if a transaction can be specified as PASS123 and PASS 456, the resulting expression would be PASS[any 3 digits]. Thus, the expression would match any instance of PASS321, PASS120, etc.

The expression, as represented by the pattern, can be used to form a subsequent expression which can be utilized by an intrusion detection system, sniffer, or firewall, to detect and trigger on the above-mentioned network at least one transaction that matches the expression.

Fault Injection Creation

Permutations of grammar and value, when offered as input to runtime software environments, tend to solicit a wide range of responses. Some of these responses are indicative of a software bug. Other responses indicate benign behavior with little environmental effect. Many software bugs have a dangerous impact on the security and/or reliability of a software system. Certain input permutations are more likely to discover or induce a bug in software, regardless of the target system (e.g., target 134 in FIG. 1).

To mutate a network transaction 130 that is sent to a target 134 (or code 124) in an SUT 115, a baseline or starting point is typically needed. This starting point is defined as a "transactional baseline". Once the transaction baseline is obtained, the transaction baseline can be used to create supplement transactions, which are mutations of the original transaction baseline. These mutations can be used to enable undesired events and are, therefore, used to discover bugs/viruses and/or other faults in the SUT 115. Thus, the mutations are transmitted as modified transactions 130 to a system-under-test 115, and feedback 132 may indicate if a fault occurrence had occurred in response to the modified transactions 130.

Various methods to mutate a transaction baseline (to cause malformation) include the following as described below: (I) "grammar injection", (II) "value injection", and (III) other vulnerability & detection methods.

(I) Grammar Injection—

Figure 3:
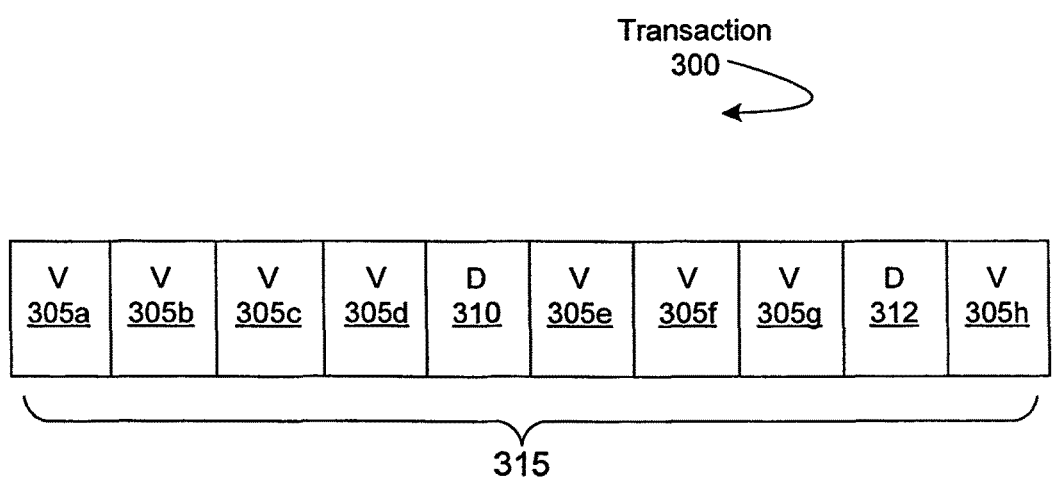
FIG. 3 is a block diagram of a transaction with value fields and delimiters.

Grammar is the order and structure to a transaction. Many transactions require value fields that are separated by metacharacters (or delimiters). FIG. 3 shows an example transaction 300 with value fields 305a through 305h and metacharacters or delimiters 310 and 312. The number of value fields and delimiters may vary. In the example of FIG. 3, value fields 305d and 305e are separated by delimiter 310, and value fields 305g and 305h are separated by delimiter 312. What determines a value and what determines a delimiter is based on numerical character values.

The trick in the method is to select a numerical range of character values that are to be treated as meta-characters. This range does not have to be continuous. The range may include several smaller sub-ranges which, when combined as a whole, constitute the set of all characters which are to be treated as delimiters.

The order 315 in which they occur determines if a malformed grammar exists. Malformed grammar on a variety of cleartext protocols, such as HTTP, could induce parser errors.

The following algorithms can be applied for creating malformed grammar. The testing unit 105 may be configured to create the following strings.

The patterns 210 represent a template for generating a plurality of transactions 130 which are delivered as network traffic 220. The construction of the pattern is particular to a technique for malforming grammar of a transaction.

Patterns consist of sub-fields (or "Functions", as they are called in the attached texts) that each have a particular behavior. The sequence of transactions represented by a pattern depend on the combination of sub-fields in the pattern. Sub-fields may be literal data values and some may represent a set of values. Sub-fields that represent sets of data are said to iterate. There are two specific ways to inter-relate subfields within a pattern, (a) Nested, and (b) Non-nested. Nested relationships cause sub-fields that iterate to multiply their results. This is called 'nested iteration'. Various examples of pattern iteration and sub-field types are described in further detail below.

1. Remove a Field(s) from a Transaction—

As shown in the example of Table 1, the original transaction includes fields with the characters ABCD and the delimiter (;) between fields. Of course, other value fields and other delimiters may be used. One of the fields (for example, with characters ABCD) is removed as shown in the modified transaction. This modified transaction may confuse a parser. Other characters may also be used besides "ABCD".

TABLE 1

| | |
|---|---|
| original transaction | ABCD; ABCD; ABCD; ABCD |
| modify transaction by removing a field | ABCD; ABCD; ABCD; |

2. Duplicate a Field (Cause a Field to Appear More than Once—

A field (with characters ABCD) is duplicated as shown in the modified transaction in Table 2.

TABLE 2

| original transaction | ABCD; ABCD; |
|---|---|
| modify transaction by duplicating a field | ABCD; ABCD; ABCD |

3. Create Double Delimiter (Cause a Delimiter to Appear Twice Between Value Fields)—

A delimiter ";" is duplicated as ";;" as shown in the modified transaction in Table 3. Other delimiters may be used besides the semicolon character ";".

TABLE 3

| original transaction | ABCD; ABCD; ABCD |
|---|---|
| modify transaction by duplicating a delimiter | ABCD;; ABCD; ABCD |

4. Send all Delimiters in a Transaction—

All characters are changed into a delimiter ";" as shown in the modified transaction in Table 4.

TABLE 4

| original transaction | ABCD; ABCD; ABCD |
|---|---|
| modify transaction by changing all characters to delimiters | ;;;;;;;;;;;;;; |

5. Send a Blank Transaction (Transaction with No Values—

Usually, part of a transaction that is considered an atomic unit is removed, as shown below in Table 5.

TABLE 5

| original transaction | ABCD;ABCD;ABCD |
|---|---|
| modify transaction by removing part of transaction | |

6. Send a Single Character Delimiter-Value Pair, at a Repeated, Large Buffer—

All characters are changed into a delimiter-value pair (e.g., "W." or "A;" as shown in the modified transactions in Table 6. These transaction types can cause buffer overflow in parsers.

TABLE 6

| single character delimiter-value pair | w.w.w.w.w.w.w.w. |
|---|---|
| single character delimiter-value pair | A;A;A;A;A;A;A;A; |

7. Send Unbalanced Pair—

For example, if an open parenthesis character "(" is present in a transaction, then the close parenthesis character ")" is omitted, as shown in Table 7. The same unbalanced pair configuration can apply to other pair-characters such as pipes "|", quotation marks, and/or other pair-characters. One of the pair-characters may appear at the end of a field, as, for example, shown by the string "ABCD; ABCD;ABCD)" in Table 7. An unbalanced pair may confuse a parser, causing the parser to treat the characters inside the unbalanced pair as special information.

TABLE 7

| original transaction | (ABCD;ABCD;ABCD) |
|---|---|
| edit transaction by creating unbalanced pair | (ABCD;ABCD;ABCD |
| edit transaction by creating unbalanced pair | ABCD;ABCD;ABCD) |
| edit transaction by creating unbalanced pair | "ABCD;ABCD;ABCD |

8. Replace delimiters with random ranges that cover the delimiter value. This means using not only the delimiter value, but a range of characters that are near to about the delimiter's original numerical value. For example, not just a '>' character, but also '<', '=', ':', ';', etc. which are close to the same value numerically. The example range would be from decimal 58 to decimal 62. The values of characters can be obtained from a standard chart of the ASCII values.

9. Use Alternative Character Encoding Through a Translation Table—

Alternative encoding is one example of a grammar injection method for fault detection.

Many programs accept user data in many different formats. For example, mail programs often accept data in Unicode, ASCII, and/or other formats. This feature can present a problem when a user can change the data format of the input transaction in such a way that the input passes security checks, and when the input transaction is parsed at the end (e.g., at the target system), the input transaction behaves maliciously.

Alternative encoding involves encoding a transaction field with characters that are equal in nature but different in representation. Table 8 lists some examples of an alternative encoding for a carriage return. These alternative encoding includes, for example, "/n" and "%2f".

TABLE 8

| original encoding | alternative encoding | Alternative encoding |
|---|---|---|
| Carriage return | /n | %2f |
| target.jsp | target.JSP | |

The technique is to use a character-replacement translation table. This may be a set-of characters replaced by an alternative set-of characters.

As another example, if a Java-Server-Page (JSP) is requested from a web server by a client, the request should be parsed. The web server is case-sensitive and only understands the lowercase ".jsp". If all caps ".JSP" is requested (see Table 8), then the file is handled via a default text handler, and as a result, the source code becomes visible at, for example, the client side.

This is a specialization of the alternative encoding method, where the character translation table is from lower-case versions of each alphabetic letter to upper-case versions of the alphabetic letter.

Figure 4:
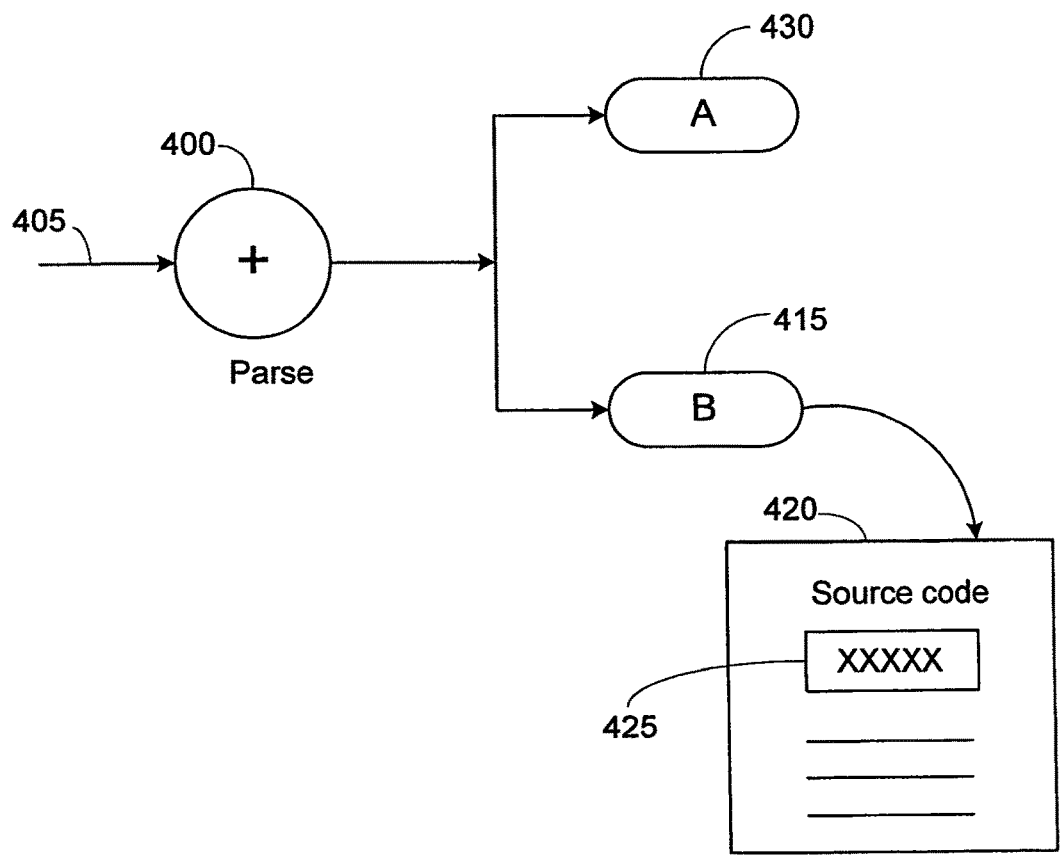
FIG. 4 is a functional block diagram of a parsing event, where a transaction includes alternative encoding.

As shown in the example in FIG. 4, the parser 400 (in a system-under-test) interprets the alternative encoding in the transaction 405 and thus misclassifies the transaction 405 (since the parser 400 is looking for a lower case version of .jsp). As a result, state 415 occurs and the actual Java source code 420 is shown via a client device such as the testing unit 105. The showing of the source code 420 may result in potential breaches of security, since the source code 420 may, for example, include passwords 425 or other information such as trade secrets. In contrast, a non-fault state 430 does not allow the showing of the source code 420.

Various other alternative encoding methods may be used such as the following:
(1) use Unicode.
(2) use International Organization for Standardization (ISO) character sets.
(3) use escaped (backslash, control, alt, and the like).
(4) convert lower-case character to upper-case character (see example above), or convert upper-case character into a lower-case character.

The following are other examples of the vulnerabilities made possible by alternative encoding.
(1) Internet Information Server (IIS) 5.0—

Using the string "..% c0% af.." in a certain way in a Uniform Resource Locator (URL) allows a malicious user to execute commands on a remote server. For example, the URL in Table 9 returns the source of default.asp.

TABLE 9 http://IPADDRESSTESTED/scripts/..%c0%af../winnt/system32/
cmd.exe?c+type+c:\inetpub\wwwroot\home\default.asp (2) IIS 4.0—

Invalid codes are passed on by the testing unit to the file system of the target. For example, the code %0G would be passed on to the filesystem, even though 0G is not a valid hexadecimal value. The sequences are then converted to actual characters by the target system, which allows for specifying some characters that are not permitted.

(3) theBat—

The following attachment name shown in Table 10 is not properly filtered due to the alternative coding in the name. The saved attached file names are indicated in Table 10 also.

TABLE 10

| attachment name with alternative encoding | Content-Type: image/gf<br>Content-Transfer-Encoding: base64<br>Content-Disposition: attachment;<br>filename="=?iso8859-<br>1?B?Li5cLi5cLi5cLi5cLi5cV2<br>LuZG93clxTdGFyd<br>CBNZW51XFByb2dyYW1zXFN0YX<br>J0dxBcMTIzLmV4ZQ<br>==?=" |
|---|---|
| Saved attached file name | C:\Windows\Start Menu\Programs\Startup\123.exe |
| Saved attached file name | ..\..\..\..\..\Windows\StartMenu\Programs\Startup\123.exe |

This is a specific example of the ISO-character set alternative encoding. The SUT is performing analysis of attached 'filenames' to ensure that the target is not being saved to an unsafe location. An unsafe location, in this example, is the 'windows' directory. Since the filter does not handle ISO-character sets, the encoded filename looks innocent and thus is allowed to pass. Once decoded, however, we can see that the filename is indeed malicious. The failure of the software-filter to handle all possible decodes of the attached content constitutes the vulnerability.

Use Prefixed Escapes
 a. value characters are prefixed with escape sequences.
 b. delimiter characters are prefixed with escape sequences.

This is an algorithm for generating alternative encodings of characters. A character, 'A', will be prefixed with a slash '/', if the resulting character sequence is '/A'. The prefix character can be chosen. A subsequent technique is to allow the prefix of a multi-character sequence. A multi-character prefix could be '^[', and the character 'A' prefixed would result in the following character sequence, '^[A'.

A specialization of the technique is to prefix delimiter characters which are chosen by numerical range, with a special character known as an 'escape' character, which can be chosen depending on the target system. An example escape character is a backslash '\', and a delimiter character ':' prefixed would result in the following character sequence, '\:'.

(II) Value Injection—

Figure 5:
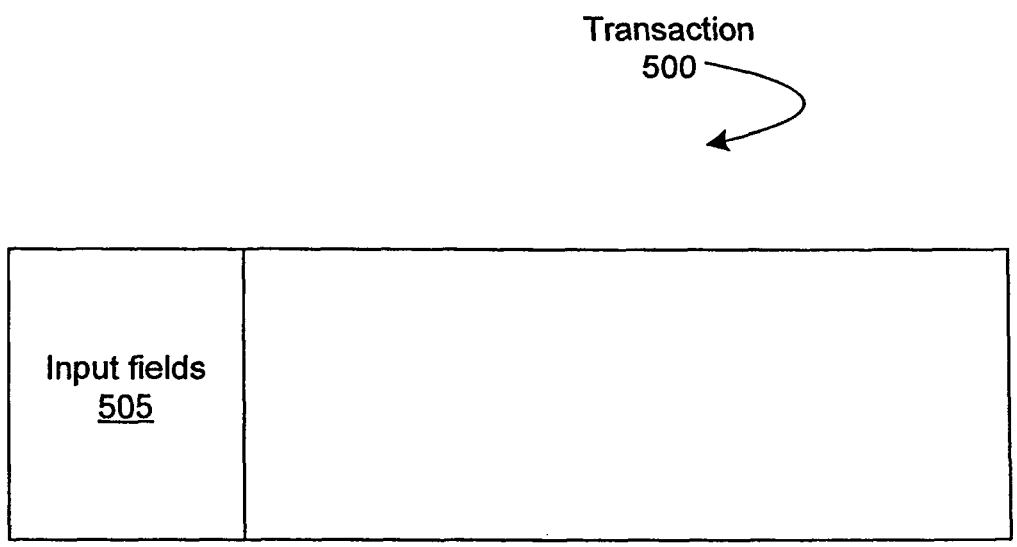
FIG. 5 is a block diagram of a transaction with an input field for receiving value injections.

Value injection does not alter the grammar of a transaction. Instead, as shown in FIG. 5, value injection injects or alters the input fields 500 in a transaction 505. Value injection can be useful, for example, to exercise inputs to Application Programming Interface (API) calls and to change the behavior of database transactions. The value injection techniques may be combined with grammar injection to obtain maximum effect.

Ghost Characters—

Ghost characters encoding is one example of a value injection method for fault detection. This method involves encoding a transaction field with characters that do not affect the transaction. Ghost characters may be added to a server-request where the characters do not affect the validity of the request and may be used, for example, to cause misinterpretations by intrusion detection systems (IDS) or firewalls that are detecting network transactions.

This is an example of multiple SUTs, each which respond to the same request. The ghost characters are significant in one SUT, while being ignored in the other SUT. The resulting transactions are thus unique to each SUT and attempts to measure the state of one SUT by the other SUT may become desynchronized.

Additionally, ghost characters can cause logs to not report correct information. Ghost characters are generally stripped out of a request or are completely ignored by the request, and as a result, ghost characters do not cause problems with the request. The testing unit 105 (FIG. 1) can be configured to insert a variety of characters into any request, regardless of protocol. Table 11 lists an example of an encoding for a ghost character.

TABLE 11

| original characters | ghost characters |
|---|---|
| ABCD;ABCD | A.B./////C.D;A.B.C/////D |

Figure 6:
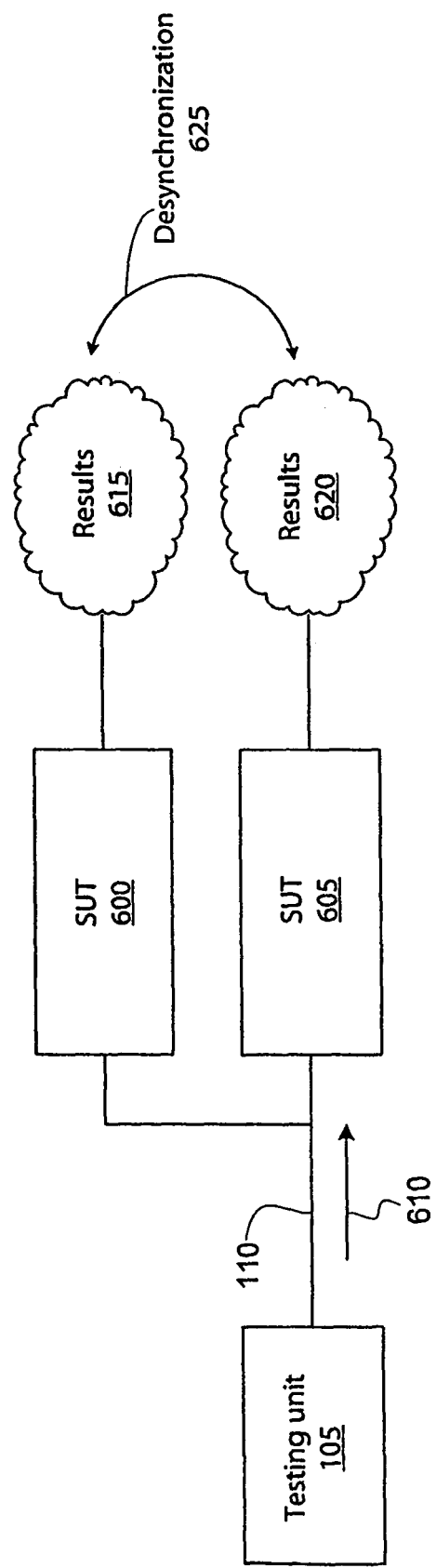
FIG. 6 is a block diagram illustrating an effect of ghost characters in a network transaction.

FIG. 6 is a block diagram illustrating an effect of ghost characters injection in a network system. Assume that system-under-test 600 and 605 are coupled to the network 110 and can receive a transaction 610 with ghost characters. SUT 600 may interpret the transaction 610 as results 615, while SUT 605 may interpret the transaction 610 as different results 620. Since the results 615 differ from the results 620, a de-synchronization 625 may occur between SUT 600 and SUT 605. For example, this outcome is detrimental if it is intended that SUT 600 and SUT 605 interpret an input transaction in an identical or similar way.

As an example, a filtering and monitoring system is looking for the string 'PASSWORD' and the target SUT accepts ghost characters '|' and ':'. The subsequently ghosted transaction is sent over the network as 'P|A:S:S:W|O|R|D'. The SUT interprets the transaction as 'PASS- WORD'. The monitoring system interprets that data as 'P|A:S:S:W|O|R|D' and thus fails to trigger on a valid PASSWORD transaction.

Input Field Injection—

System calls are used internally with a program to access the file system or spawn other processes. If a remote user can control the arguments to a system call, the user can often cause commands to be run improperly or private files to be viewed or modified.

This method involves replacing an input field in a transaction field with characters that may cause faults. This input field is typically used in system calls or API calls for enabling an event such as, for example, the opening of a file.

Filenames—

For example, in an effort for a target system in a system-under-test to open a password-protected file (or to open a log file), the characters may be placed in the input field as shown in Table 12.

TABLE 12

| Input field content modification |
| --- |
| GET /....../password |
| GET /../../../etc/password |

The remote machine (e.g., testing unit 105) requests the file "/ . . . . . . /" and the contents of the root filesystem will be displayed. In this manner, any file on the system can be accessed.

As also shown in Table 12, a repeatable Relative Path bug allows the web request to traverse upward in the filesystem by inserting "../" into the path. The user can view any file on the system by using "../" to traverse the filesytem upward.

Another example of using value injection to alter a file path is as follows. A SUT accepts [request][target], i.e., GET /index.html. The value stored in [target], directly altered to '../../../../etc/passwd' indicates a target on the system. The target is valid. The subsequent transaction, GET ../../../../etc/passwd is valid in the context of a fileystem. If the server software fails to filter the directly modified value, the SUT will be fooled into returning a file that was not intended as part of the design.

Numerical Ranges—

Typically, if there is a range that may have a limit, then maximum values, mid-point values, minimum values, and/or signed or unsigned and off-by-one errors may produce a fault. For example, if an input field has the content ABCD, then changing the input field content A*.D may cause a fault in the target system because the character "*" is out of range with the Hexadecimal values for the characters A through Z.

If there is a range restriction on an input, such as the numbers 1-100, then the values 1, 50, and 100 should be attempted. If the SUT expects numbers to be in the range 1-99, the number 100 may cause a fault, even though technically, the number 100 can be supplied.

Signed conversion errors occur because the same number, occupying the same amount of data space, can represent either a zero-based range, i.e., 0-255, or a signed range with zero as a midpoint, i.e., −127 to +127. Supplying a value of 255 may result in a signed representation of −1. This may cause arithmetic to be invalidated.

User Identity—

Other value injection techniques include controlling user-identity (fields which indicate resource names or user-identities) and brute force attacks based on dictionary.

If a number is used to represent a user identity, then this number can be iterated throughout a range in an attempt to spoof the identity of another user. If the user ID is AAAA-0000 then a brute force attack would iterate the input values through a range:

AAAA-0001
AAAA-0002
. . .
. . .
AAAA-9999

Also, the alphabetical characters can also be iterated throughout a range:

AAAB-0000
AAAC-0000
. . .
. . .
ZZZZ-0000

Passwords— brute force attacks. This is a simple example of a sub-field that represents a set of data. The set would be a dictionary of possible passwords. The pattern would supply every password from the dictionary.

Cookies— altered over a range. This is the same as User-identity example above.

Range Injection— alter input characters over a range that includes the character. This is the same as User-identity example above.

Regular Expression & Globbing —

(a) Replace Field with "*" or "*.Exe" (Many Possibilities):

Some API calls allow the specification of a matching expression, such as '?.exe'—which means match any single character followed by '.exe'—so the expression would match 'A.exe' and 'Z.exe' both. Different systems have different expression formats. The key is to supply expressions and determine if they are being interpreted by the target SUT. Matching expressions may be used to cause the wrong file to be opened or returned.

(b) Can Cause SQL Transaction Problems:

The character and the '%' character are expressions for matching in SQL transactions. Supplying input fields such as '%' and '%%' may cause multiple records to be returned from the database.

Buffer Overflows — a. This method is described below.
b. This technique can be combined with other methods.
c. This technique allow character-ranges to be controlled.

The buffer overflow technique can be categorized as a value injection method. To create a buffer overflow fault injector, extra characters are inserted into a transaction where the characters are typically separated by a normal command or field separator. This fault injector or mutated transaction is transmitted to, for example, a system-under-test 115 in order to detect faults in the SUT 115.

Typically, in software operations, a process is broken into "functions" that are called periodically so that the process can manage memory and input/output operations. When a function is executing, the function needs to store data regarding the operation that is being executed. When a function needs to store a temporary value, the function places the data on a stack, which is a memory region that will grow and shrink as functions use the memory region. A network transaction may be formed by fields, and if a field is made too large, the problem of buffer overflow may occur. Thus, when a program writes past the bounds of a buffer, this buffer overflow condition will cause the next contiguous chunk of memory to be overwritten.

Figure 7:
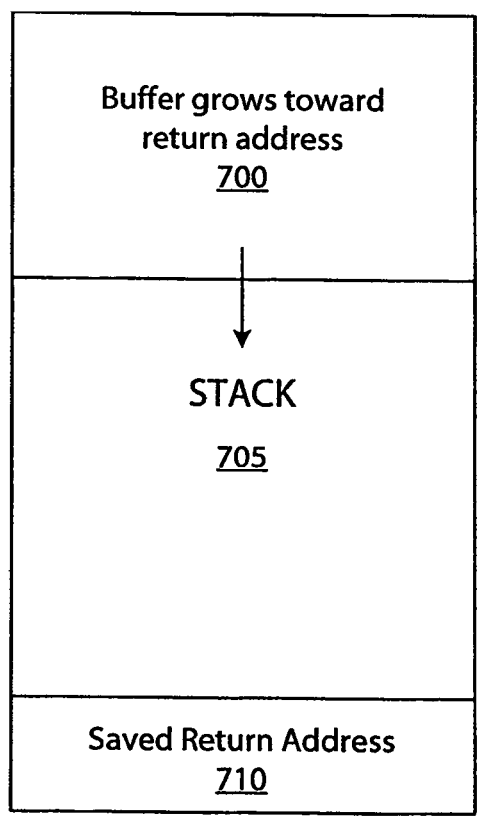
FIG. 7 is a block diagram illustrating a buffer overflow condition.

The reading or writing past the end of a buffer can cause a number of diverse (and often unanticipated) behaviors: (1) programs can act in strange ways, (2) programs can fail completely, and/or (3) programs can proceed without any noticeable difference in execution. As shown in the example in FIG. 7, during a buffer overflow, the buffer 700 overflows on the stack 705 and grows toward a saved return address 710. Thus, the attacker may be able to change the return address 710. As a result, when the function is finished executing, the return address 710 is popped off the stack and execution branches to the address. If the attacker can overwrite this return address 710, then the attacker has control of the processor.

Table 13 lists some of the function calls that commonly lead to buffer overflow conditions. Additional details on buffer overflow conditions are described in, for example, HACK PROOFING YOUR NETWORK: INTERNET TRADECRAFT, Copyright 2000, published by Syngress Media, Inc., 800 Hingham Street, Rockland, Mass. 02370. The above reference, HACK PROOFING YOUR NETWORK: INTERNET TRADECRAFT, is fully incorporated herein by reference.

TABLE 13

| Function Call | Function Call | Function Call |
|---|---|---|
| Strcpy | Strcat | Wstrncpy |
| Lstrcpy | Lstrcat | Scanf |
| lstrcpyA | lstrcatA | Sprintf |
| lstrcpyW | lstrcatW | Wscanf |
| Lstrcpyn | Wcscat | Strncpy |
| lstrcpynA | Strncat | Memmove |
| lstrcpynW | Wstrncat | Swprintf |
| Wstrcpy | Memcpy | Fgets |
| Gets | Fgetws | Getws |

The following are other examples of the vulnerabilities made possible by input field injection.

(1) Esery 2.50—

A user can view any file on the system by using "../" to traverse the filesystem upward. For example, the following (as shown in Table 14) would show all configuration information, including account names.

TABLE 14 http://127.1:3128/../../../conf/Eserv.ini (2) SYMANTEC Mail-Gear 1.0 Web Interface Server —

Using the "../" string, a user can fool a Common Gateway Interface (CGI) script into displaying any file on the system. For example, the following (as shown in Table 15) would display the boot.ini file on an NT system.

TABLE 15 http://127.1:8003/Display?what=../../../../../boot.ini

The entire network can also be scanned for problems by inserting a procedural function in place of the destination IP address, and then setting up a Checkpoint to watch for a response that implies that the scan was successfully performed.

III. Other Remote Security Vulnerabilities & Detection Methods

Data Leakage—

Data leakage occurs when an application or network gives away valuable information "for free" to a potential attacker. For example, data leakage is problematic if the attacker is trying to determine the structure of a filesystem or the contents of an accounts database. A common place where data leakage occurs is within error messages. An attacker may craft special requests causing an error result, and the error message sent to the attacker may contain valuable information such as the status of the application, the existence of a user account, or the topology of a database or file system.

As an example, CGI programs can be scanned for leaked data. Every response to the scans below (Table 16) can be parsed for relevant data or saved to disk. Error conditions can be detected or certain tags can be gathered from the response.

TABLE 16

| CGI program scan for leaked data |
|---|
| GET /cgi-bi/pic.cgi?50000 |
| GET /cgi-bi/pic.cgi?50001 |
| GET /cgi-bi/pic.cgi?50002 |
| GET /cgi-bi/pic.cgi?50003 |
| GET /cgi-bi/pic.cgi?50004 |
| GET /cgi-bi/pic.cgi?50005 |
| * |
| * |
| * |
| * |
| GET /cgi-bi/pic.cgi?50999 |

The following are other examples of the vulnerabilities made possible by data leakage technique.

(1) Gathering Process Information from the Auth Service—

By connecting the Auth service, a remote attacker can determine which processes are running as root.

(2) Determine which Accounts Exist—

If the response for a bad password is different than the response for a bad user name, then a remote attacker can determine valid usernames by noting the different responses.

(3) Error Conditions Leak True Path—

Connecting to a CGI script incorrectly can cause the server to return actual filesystem paths. This fault can be tested for by simply noting the return values from the scripts for certain key characters such as "c:\", "inetpub", and/or the like.

Injection of Unfiltered Metacharacters to Secondary Process—

A server component may call another component with user-supplied input. In this situation, the server component filters certain characters or character sequences to limit the string that is passed to the other component. For example, a CGI script that lists the contents of a download directory might call "ls DIRNAME", with DIRNAME being supplied by the client. If certain characters are not filtered, then requesting the directory ";rm -rf/;" would cause the command "ls;rm -rf/;" to be run on the command line. This particular command would be very destructive.

Table 17 lists at least some the characters that should never be passed to the shell. The target system can be tested to determine which characters are filtered and not filtered.

These delimiters and escaped sequences can be stored in a file and directly read from the file by the testing unit 105 (FIG. 1) to simplify testing.

TABLE 17

| characters to avoid passing to the shell |
|---|
| ; < > * \| ' & $ ! # ( ) [ ] { } : ' " / |

Figure 8:
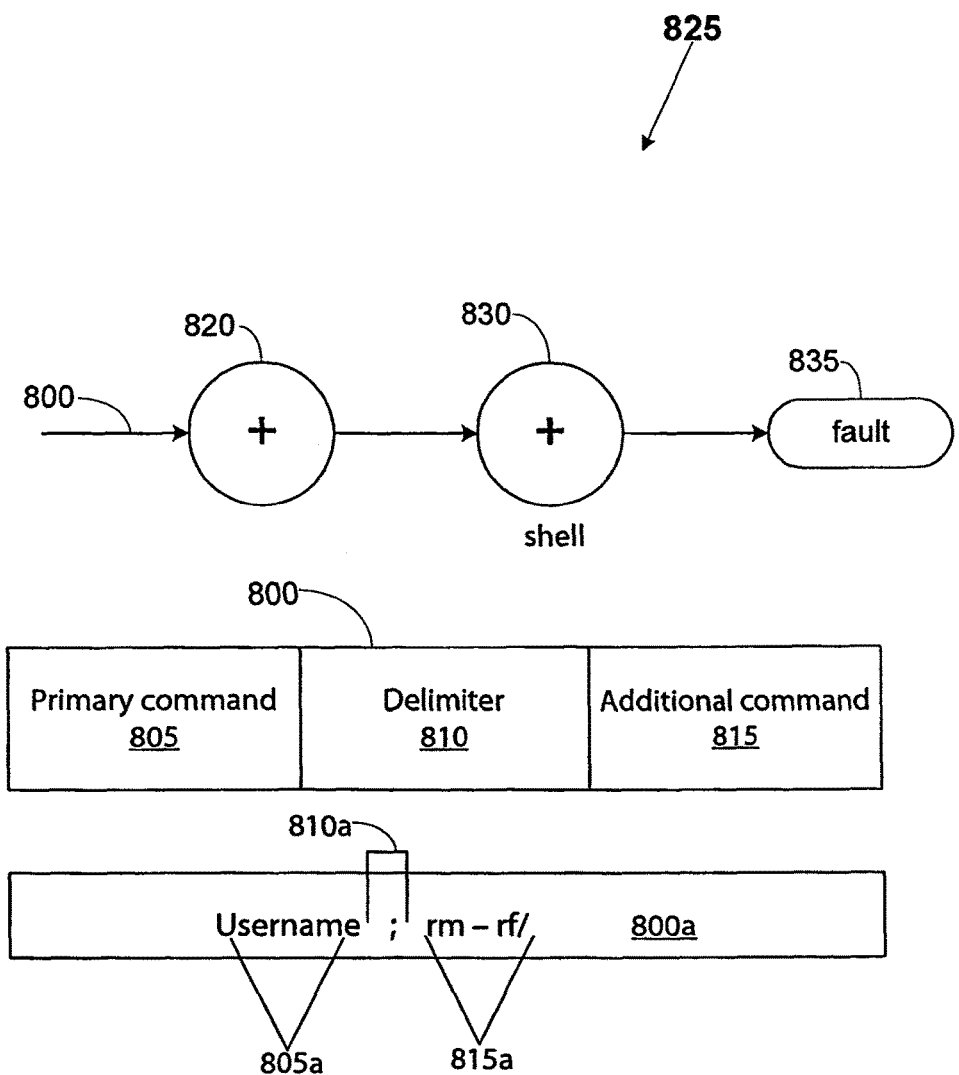
FIG. 8 is a functional block diagram of a parsing event, where a transaction includes unfiltered metacharacters to secondary process.

As shown in the example in FIG. 8, a transaction 800 may include primary information 805 followed by a delimiter' 810 and an additional command 815. A first parser 820 (in an SUT 825) may allow the delimiter 810 and additional command 815 to pass through. The shell in the second parser 830 will then execute the additional command 815 to cause a fault condition. As an example, the content in the transaction field 800a may be put in an on-line form on a webpage. The content may be as follows in Table 18. The primary command 805a content is the username "username". The delimiter 810a is ";". The additional command 815a is "rm -rf/". The username is passed through with the delimiter ";" and additional command "rm -rf/". When the shell in the second parser 830 executes the additional command 815a, a fault event 835 is generated such as the deletion of contents in the hard drive of the system-under-test.

TABLE 18

| Transaction field content |
|---|
| username;rm -rf/ |

Figure 9:
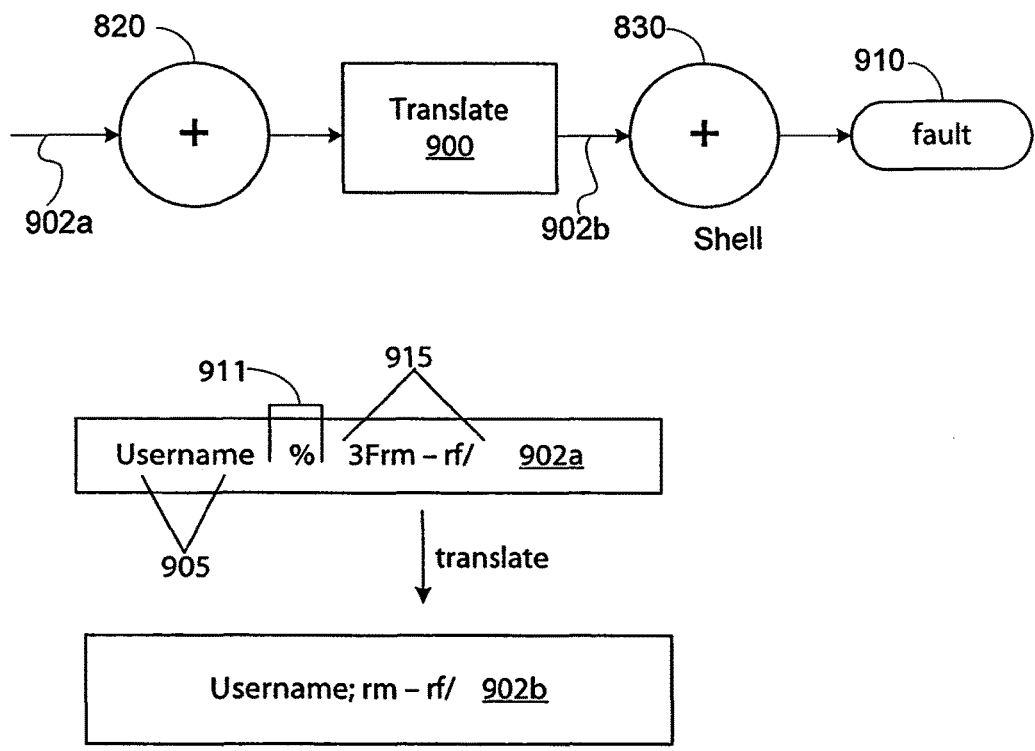
FIG. 9 is a functional block diagram illustrating a translation of a metacharacter leading to a fault condition.

As shown in FIG. 9, another method is by having a translator 900 convert a delimiter into a character that should not be passed to the shell. For example, as shown in Table 19, assume that the original transaction content 902a includes primary command 905 ("username"), delimiter 910 ("%3F"), and additional command 915 ("rm -rf/"). The parser will pass the original content "username %3Frm -rf/". However, the translator 900 will convert the original delimiter "%3F" into ";". As a result, the parser 830 will parse the translated transaction 902b with content "username;rm -rf/", leading to a fault event 910 of hard drive content deletion.

TABLE 19

| original transaction field content | translated transaction field content |
|---|---|
| username%3Frm -rf/ | username;rm -rf/ |

The following are other examples of the vulnerabilities made possible by Injection of Unfiltered Metacharacters to Secondary Process.

(1) Campas CGI—

A remote user can execute any command on the system by executing a CGI script as shown in Table 20. This command would print the password file.

TABLE 20

| GET /cgi-bin/campas?%0acat%0a/etcpasswd%0a. |
|---|

(2) fcheck—

The checker "fcheck" is a file integrity checker written in Pen. This checker uses the system( ) call and passes the filename to the shell. If the filename has embedded metacharacters, then arbitrary commands can be run.

Extraneous Meta-Characters for Causing Misclassification—

Classification is performed by many on-line applications. Complex applications often handle multiple types of requests. The application determines which type of request is being submitted and handles the request appropriately. For example, if a request for a graphics file is made to a web server, the image is streamed to the client browser in binary. If a request for a script is made to a web server, then the script is parsed and interpreted by the web server and the result is passed to the web client. Many web servers determine the type of file by examining the file extension (usually three characters following the last period in the file name). If a web server can be fooled into misinterpreting the type of file, security problems may occur. For example, many script files contain sensitive data such as passwords or file structures. If web-server can be tricked, a remote attacker can obtain the source code to the script.

This method involves encoding characters in a transaction that causes misclassification of the transaction. These meta-characters are not alternative encoding because characters are not being converted into equivalent characters. These meta-characters are also not ghost characters because these characters do change the transaction. These characters do not involve input field injection because the input field is not changed or because extraneous meta-characters are added into the original characters in the input field.

Figure 10:
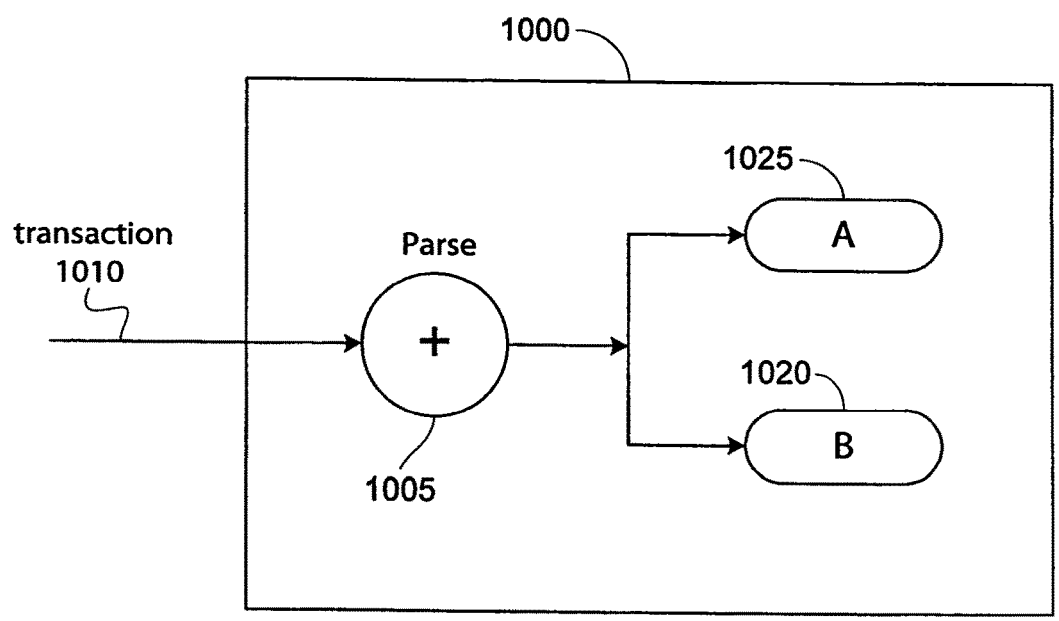
FIG. 10 is a functional block diagram illustrating a parsing event, where extraneous metacharacters result in a misclassification.

FIG. 10 illustrates a block diagram of a method of using extraneous meta-characters for causing fault injection in an SUT (or target) 1000. A parsing event (performed by parser 1005) acts upon an input transaction 1010. Based on the results of the parsing event, a result (A) 1015 or result (B) 1020 is generated. The input transaction 1010 can be changed such that, after the parsing event, a result (A) 1025 is changed into a result (B) 1020 (or a result (B) 1020 is changed into a result (A) 1025). If, for example, the input transaction 1010 is changed so that the parsing event generates the result (B) 1020 (instead of a result (A) 1025), then particular problems (such as a security violation) will occur in the SUT 1000 since the SUT will now be operating on data that it is not supposed to see.

The ASP DOT Bug—

If an ASP file is requested on MICROSOFT IIS Servers, then the file should be parsed. However, on some servers, if an additional period (.) is appended to the end of the file name (file.asp.), then IIS will not understand that an ASP file is being requested, and the default text handler will deliver the source code instead.

Table 21 lists an example of modifying a source code based on use of extraneous meta-characters. The source code file "target.asp" is changed to "target.asp." and, as a result, the parser 1005 misclassifies the file as a non-asp file because of the modified extension ".asp.", resulting in result (B) 1020 instead of result (A) 1025. The result (B) 1020 may be, for example, a default action that shows source codes containing passwords. As a result, the revealed passwords will permit security to be compromised.

TABLE 21

| source code file | source code file with extraneous meta-characters |
|---|---|
| target.asp | target.asp. |

The following are other examples of the vulnerabilities made possible by Extraneous Meta-characters For Causing Misclassification.

(1) Truncating Strings to Webhits.dll—

On MICROSOFT IIS Servers, a problem exists where an Internet Server API (ISAPI) filter may truncate a URL. Table 22 lists a problematic request that is passed to the webhits.dll because the request ends in (.htw) but the DLL then truncates the URL to about 200 characters.

TABLE 22 http://server/somefile.txt%20...-%20.htw

Sensitive Dependance Resource Consumption—

If an application spends an undue amount of resources on any particular transaction, then that transaction may be manipulated to create a resource consuming "denial of service" (DoS) situation. The HTTP GET request may be modified and created into templates for valid and invalid requests.

Additionally, if random garbage content is inserted in a transaction field, the target will parse the content, and the parser will work harder to understand the field content. This condition may result in DoS problems.

The following are other examples of the vulnerabilities made possible by Sensitive Dependance Resource Consumption.

(1) Fragmented & Segmented TCP/IP—

Transmission Control Protocol/Internet Protocol (TCP/IP) packets can be fragmented and segmented. Furthermore, these fragments may overlap. If these fragmentations and segmentations occur, then the server must reconstruct the data. Bombarding servers with this type of traffic can cause the server to stop responding, due to the overhead processing of the TCP/IP protocol.

(2) ICMP Amplifier (SMURFING)—

Some networks will respond to broadcast Internet Control Message Protocol (ICMP) "ping" packets, and given a spoofed source address, the responses will bombard a target with traffic. The overload may cause the target network to fail.

Invalid State—

Almost all programs have a state (i.e., do certain things in a certain order). At each point where a program can make a decision, the program is said to be in a certain state. The program will typically have a different set of choices to make depending on which state the program is at. Problems occur when a program can make invalid decisions. Typically, an invalid decision can lead a program into a processor-loop or can lead a program into simply crashing. An invalid decision may also lead to a resource leak. An invalid decision may lead a program into waiting for input that will never arrive or may lead a program into a deadlock situation. These situations may lead to denial-of-service problems.

In one embodiment, the testing unit 105 (FIG. 1) can replicate TCP sessions. The testing unit 105 can modify and/or edit patterns in order to test, for example, a TELNET server for a variety of configuration options in the client-server relationship.

The following are other examples of the vulnerabilities made possible by an invalid state condition.

(1) Real Server Malformed URL—

The following URL in Table 23 can cause a server hang, and only requires an additional question mark (?) at the end of the URL.

TABLE 23 http://206.190.42.7viewsource/template.html?

(2) MSDTC.EXE—

The testing unit 105 (FIG. 1) can be connected to a TCP port 1027 on a Windows-NT machine and then disconnected. The MSDTC.EXE begins to consume 100% of CPU utiliztion.

(3) Stream of Zeros—

The testing unit 105 sends a stream of binary zeros to any number of Windows-2000 TCP or User Datagram Protocol (UDP) ports, and begins to consume 100% of CPU utilization.

(4) HP OpenView OmniBack—

The testing unit 105 connects multiple times to TCP port 5555 and HP Openview OmniBack goes to 100% CPU usage and becomes locked. As a result, a restart is required.

(5) PCAnywhere—

The testing unit 105 is connected to TCP port 5631 and sends a large string of garbage characters. PCAnywhere will then hang.

Blind Trust—

A problem with network is blindly trusting data supplied by a client. Often, a piece of client and server software is written in tandem in such a way that the client would never send dangerous data to the server. However, an attacker could re-write portions of the client software in such a way as to break the security.

As an example, assume that a server accepts a username and password from the client. The client calculates the length of the password, and supplies this length value along with the password and the username. If the amount of server-memory allocated for the password was based on the user-supplied value, then the remote-user could easily cause a fault.

The following are other examples of the vulnerabilities made possible by the blind trust technique.

(1) Testing of LOTUS Domino Mailbox—

The testing unit can send a request to a server in order to send or receive electronic mail. This request contains the name of the user's mailbox. The testing unit can be used to sniff and replay this request, and alter the request so that a different user's mailbox is being specified. The current user does not have authority to access the different mailbox being specified. It has been found that LOTUS Domino does not validate the mailbox-name. The mailbox name that is specified in the request is the name that is used. Thus, a client can authorize correctly with the mailbox and then change the mailbox name to access the mailbox of any other user.

(2) Testing Windows 9×SMB Vulnerability—

In the Windows 9×SMB, the password length is passed to the server in the same packet as the password, and only the number of characters specified in the length is checked against the real password. Thus, if a length of 1 is passed, less than 255 passwords are possible, and as a result, brute-force attacks are not difficult to carry out.

Below Threshold—

One common type of security bug is due to an attacker performing an attack under the threshold of logging software. The threshold can appear in the logging mechanism of a piece of software or in an IDS system. Testing for this type of vulnerability can involved, for example, inputting an item that normally would be logged in a lesser or less visible manner. In the "drip" port scanning method, a port is scanned with the requests transmissions spread out over a long period of time. IDS systems often are unable to correlate data over such a long period of time. The problem results from having too much data over that period of time to perform intelligent correlation of all of the data.

The following are other examples of the vulnerabilities made possible by the below threshold technique.

(1) Secure Shell (SSH)—

Earlier versions of SSH had a login bug where if a user had entered a bad password one time or two times, a failed login was not recorded. The failed login was only recorded if the user failed three times.

(2) Snort—

Snort detects unusual fragment usage on a network. However, if the fragments are over 128 bytes, the fragments are not flagged as unusual.

Improper Configuration—

Many systems have the potential to be secure but remain vulnerable due to improper installation and configuration. These improper configuration include improper file and directory permissions, improper rules on how to handle certain commands, and failure to change a default password.

Traversing Methods

Figure 11:
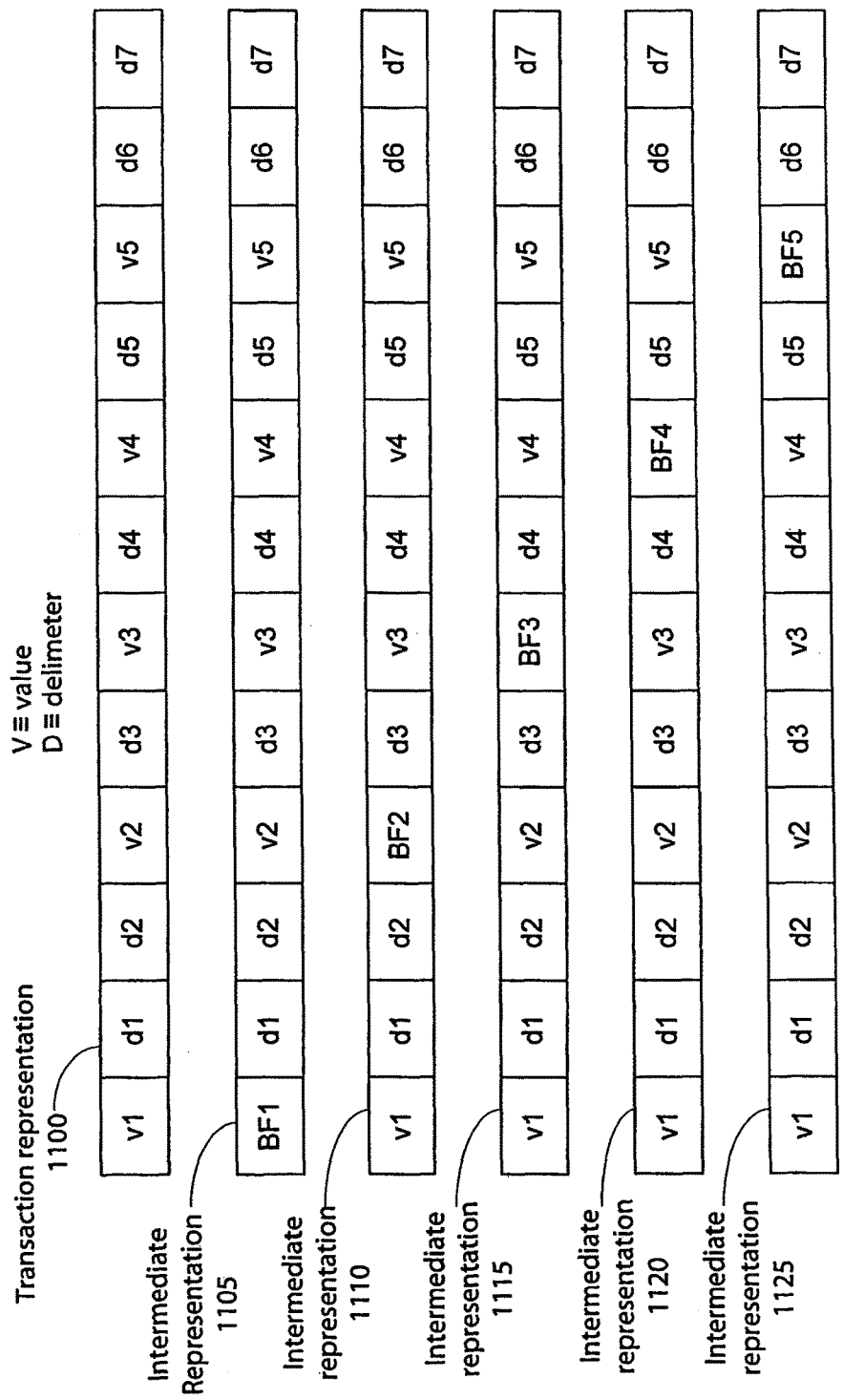
FIG. 11 is a block diagram illustrating a method of fault injection by use of a traversing technique, in accordance with an embodiment of the invention.
Figure 12:
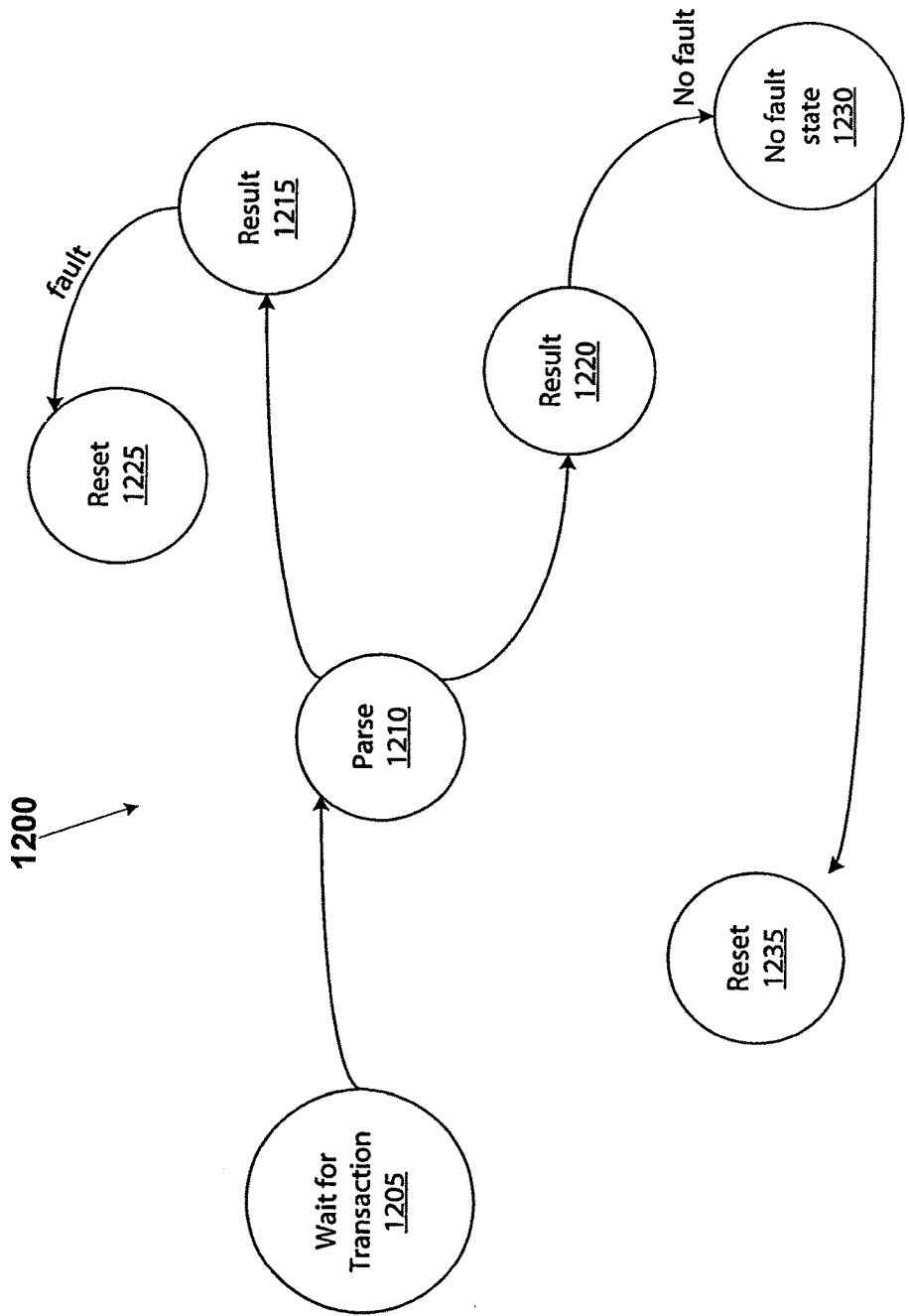
FIG. 12 is a state diagram illustrating a fault detection method according to an embodiment of the invention.

FIG. 11 is a block diagram illustrating a method of fault injection by use of a traversing technique, in accordance with an embodiment of the invention. The testing unit 105 can selectively parse out delimiters in a given transaction. For example, assume that a transaction representation 1100 has values (V1 to V5) and delimiters (d1 to d7) as shown in Table 24.

TABLE 24

| V1 | d1 | d2 | V2 | d3 | V3 | d4 | V4 | d5 | V5 | d6 | d7 |
|----|----|----|----|----|----|----|----|----|----|----|----|

The delimiters can be parsed out to obtain intermediate representations 1105, 1110, 1115, 1120, and 1125. For intermediate representation 1105, the value V1 is replaced with a buffer (a function) BF1. Each buffer BF may have a range of, for example, 1 to 1000, in increments of 100. Thus, in this example, the intermediate representation 1105 will have a total of 10 patterns.

For intermediate representation 1110, the value V2 is replaced with a buffer BF2, with the buffer BF2 having a range of, for example, 1 to 1000, in increment of 100. Thus, intermediate representation 1110 will also have a total of 10 patterns. Similarly, intermediate representations 1115, 1120, and 1125 each have values V replaced by the buffer BF.

Thus, FIG. 11 illustrates a method of converting an original transaction into templates for fault testing.

Generation of Network Traffic Based on Patterns

A "pattern" specifies how a packet is to be generated over a network. Thus, a pattern represents a set of rules for generating packets. A single pattern can be responsible for generating, for example, thousands of packets. A pattern could, for example, generate DNS traffic, HTTP traffic, and/or denial-of-service attacks.

Various methods are now discussed for building patterns that can be used for different types of injections for purposes of fault testing. Table 25 lists a collection of "functions" that may form a pattern. These functions can specify how to build, for example, an Ethernet header, an Internet Protocol (IP) header, a Transmission Control Protocol (TCP) header, and a source port. By using functions together, desired packet sequences can be generated.

TABLE 25

| Function | function | function | function |
|----------|----------|----------|----------|
| Ethernet header | IP header | TCP header | Source port |

The tables listed below indicate possible values for the functions in patterns for use in the fault injection testing of a system-under-test.

The simplest function is static-text, which a user can type in the text character that is sent over a wire of a network. Table 26 lists a generated pattern where a packet is printed over the wire in the network. Every function can be individually edited. Thus, the functions for the Ethernet header, IP header, TCP header, and source port for a pattern will have the values A, A, B, B, respectively.

TABLE 26

MY PATTERN [A] [A] [B] [B]
results in the following network output:
A A B B

More complex functions may include, for example, a sequence through a series of numbers or read values from a file. The file may be in, for example, the memory 107 (FIG. 1) which may be integrated in or accessible to the testing unit 107 (FIG. 1). Functions can also perform the task of handling activities such as calculating TCP/IP checksums, packet lengths, and/or dealing with Ethernet addressing. Functions may also perform repetitive tasking and may be derived objects that use an application program interface (API).

Table 27 lists generated patterns where a packet is printed over a wire in a network with use of a sequence number. Functions that cause more than one packet to be generated are called "iterating functions". A pattern with one or more iterating functions will generate multiple packets over a wire. One type of iterating function is the number sequence. The number sequence iterates through a range of integers. For example, there are number sequences available for 8-bit, 16-bit, and 32-bit numbers.

TABLE 27

MY PATTERN [A] [A] [B] [B] [sequence 1-5]
results in the following network output:
A A B B 1
A A B B 2
A A B B 3
A A B B 4
A A B B 5

Table 28 lists generated patterns where a packet is printed over a wire in a network, with the source port function using a sequence (e.g., sequence 4 to 6).

TABLE 28

MY PATTERN [A] [A] [B] [sequence 4-6]
results in the following network output:
A A B 4
A A B 5
A A B 6

Table 29 lists generated patterns where a packet is printed over a wire in a network, with the source port function using a sequence number in flat mode.

TABLE 29

MY PATTERN [1] [2] [3] [sequence 1-2]
results in the following network output:
1 2 3 1 1
1 2 3 2 2

Table 30 lists generated patterns where a packet is printed over a wire in a network, with the source port function using a sequence number in nested mode.

TABLE 30

MY PATTERN [1] [2] [3] [sequence 1-2]
results in the following network output:
1 2 3 1 1
1 2 3 1 2
1 2 3 2 1
1 2 3 2 2

Table 31 lists generated patterns where the source port function is using a sequence (e.g., 1 to 3) in a parent pattern, and the parent pattern is with, for example, two child patterns. A child pattern behaves as a normal pattern, except the child pattern is only generated along with its parent pattern. Packets can occur in a particular order by making them children patterns.

TABLE 31

PARENT [1] [2] [3] [sequence 1-3]
   CHILD [1] [2] [3] [5]
   CHILD [1] [2] [3] [6]
results in the following network output:
1 2 3 1
1 2 3 5
1 2 3 6
1 2 3 2
1 2 3 5
1 2 3 6
1 2 3 3
1 2 3 5
1 2 3 6

Table 32 lists generated patterns having multiple parent patterns with children patterns.

TABLE 32

PARENT [A] [A]
   CHILD [B] [B] [HELLO]
   CHILD [B] [C] [HELLO]
   CHILD [B] [D] [HELLO]
   CHILD [B] [E] [HELLO]
PARENT [C] [C]
   CHILD [D] [B] [HELLO]
   CHILD [D] [C] [HELLO]
   CHILD [D] [D] [HELLO]
   CHILD [D] [E] [HELLO]
PARENT [E] [E]
   CHILD [F] [B] [HELLO]
   CHILD [F] [C] [HELLO]
   CHILD [F] [D] [HELLO]
   CHILD [F] [E] [HELLO]
results in the following network output:
A A
B B HELLO
B C HELLO
B D HELLO
B E HELLO
C C
D B HELLO
D C HELLO
D D HELLO
D E HELLO

TABLE 32-continued

E E
F B HELLO
F C HELLO
F D HELLO
F E HELLO

Table 33 lists generated patterns having a parent pattern with an iterating child pattern. Iterating functions are noted with an asterisk [*n] where n indicates the number of times that the function will iterate. Iterating children patterns contain an iterating function within them such as a buffer overflow test or a number-sequence. An iterating child will generate many packets.

TABLE 33

PARENT [A] [A]
   CHILD [B] [*10] (will generate 11 times, starting from 0)
results in the following network output:
A A
B 0
B 1
B 2
B 3
B 4
B 5
B 6
B 7
B 8
B 9
B 10

Table 34 lists generated patterns having an iterating parent pattern with an iterating child pattern.

TABLE 34

PARENT [A] [A] [*3]
   CHILD [B] [*2]
results in the following network output:
A A 0
B 0
B 1
B 2
A A 1
B 0
B 1
B 2
A A 2
B 0
B 1
B 2
A A 3
B 0
B 1
B 2

Table 35 lists generated patterns having a parent pattern with a 3-way handshake Checkpoint. A checkpoint object permits a pattern to react intelligently to responses from a system-under-test. A pattern may be iterating until it hits a checkpoint, and the checkpoint will inform the testing unit 105 to stop the iteration task until a decision has been made. Checkpoints can be assigned to patterns in order to alter the behavior of the patterns.

The 3-way handshake checkpoint is typically used exclusively for spoofing TCP/IP sessions to a remote host. When the 3-way handshake is used with a parent pattern, the child patterns are often sent as part of the TCP session.

The 3-way handshake is noted in parenthesis in Table 35 because it is derived from the contents of the parent packet, A A, but it is not a direct dump of A A onto the network; it is only indirectly based on the contents of A A. After the 3-way handshake is complete, A A is handled normally and dumped directly onto the wire along with its children.

The SYNC ACK return packet is received from the system-under-test and is a type of packet that is related to TCP. The information from the return packet is then placed into the PARENT pattern prior to sending the PARENT pattern to the system-under-test. This process permits information to be obtained about the state of the system-under-test.

TABLE 35

3WAY-PARENT [A] [A] [3]
   CHILD [B] [HELLO WORLD]
results in the following network output:
   (A A) SYNC ->
   (A A) <- SYNC ACK
   A A
   B HELLO WORLD Table 36 lists generated patterns having a parent pattern with an Auto-TCP-Sequence with multiple children patterns. The 3-way handshake is useful because it automatically sets up the TCP sequence numbers in a session. The TCP sequence numbers are typically required for proper TCP session to be handled. Patterns that are auto-sequencing a TCP session will use the Auto-TCP-Sequence function.

In Table 36, the Auto-TCP-Sequence number keeps count so that each child packet is considered in its proper order on the target device (system-under-test). The first child always has the same sequence as the parent, as typical in the operation of TCP handshakes. If an actual 3-way TCP handshake is performed, the auto-sequence number is typically required for proper TCP session handling.

TABLE 36

PARENT [A] [A] [AutoTCPSequence]
   CHILD [B] [AutoTCP Sequence]
   CHILD [C] [AutoTCP Sequence]
   CHILD [D] [AutoTCP Sequence]
   CHILD [E] [AutoTCP Sequence]
results in the following network output:
   A A 1
   B 1
   C 2
   D 3
   E 4

Table 37 lists generated patterns having a parent pattern with a 3-Way Handshake Checkpoint & Auto TCP Sequence function. The first three packets are considered the "3-way handshake" of TCP/IP. After the 3-way handshake is completed, the actual patterns are dumped onto the wire. The auto-TCP-Sequence is incremented for each packet, correctly indicating the current position in the byte stream for each TCP packet.

TABLE 37

3WAY-PARENT [A] [A] [Auto TCP Sequence]
   CHILD [B] [Auto TCP Sequence] [HELLO WORLD]
   CHILD [C] [Auto TCP Sequence] [HELLO WORLD]
   CHILD [D] [Auto TCP Sequence] [HELLO WORLD]
   CHILD [E] [Auto TCP Sequence] [HELLO WORLD]
results in the following network output:
   (A A) SYNC ->
   (A A) <-SYNC ACK
   (A A) -> ACK
   A A 1

TABLE 37-continued

B 1 HELLO WORLD
C 11 HELLO WORLD
D 21 HELLO WORLD
E 31 HELLO WORLD

Table 38 lists generated patterns having a parent pattern with an Auto-TCP-Sequence with iterating child pattern.

TABLE 38

PARENT [A] [A] [Auto TCP Sequence]
   CHILD [B] [Auto TCP Sequence]
   CHILD [C] [Auto TCP Sequence] [*3]
   CHILD [D] [Auto TCP Sequence]
   CHILD [E] [Auto TCP Sequence]
results in the following network output:
   A A 1
   B 1
   C 2 0
   C 2 1
   C 2 2
   C 2 3
   D 3
   E 4

Table 39 lists children pattern reference data in a parent pattern. Thus, reference data can be referenced between patterns. A child pattern can, for example, reference data in another child pattern or even in the parent. In Table 39, the parent pattern has a small sequence from 0-3, and Child C references the Z function in the parent. If this were part of a TCP session, each iteration of the parent would be an entirely new TCP handshake/session.

TABLE 39

PARENT [A] [A] [Z *3]
   CHILD [B] [H]
   CHILD [C] [PARENT -> Z]
   CHILD [D] [H]
   CHILD [E] [H]
results in the following network output:
   A A Z0
   B H
   C Z0
   D H
   E H
   A A Z1
   B H
   C Z1
   D H
   E H
   A A Z2
   B H
   C Z2
   D H
   E H
   A A Z3
   B H
   C Z3
   D H
   E H Table 40 lists generated patterns having a parent pattern with a 3-Way Handshake Checkpoint with Auto-TCP-Sequence with Reference. The pattern has a 3-way handshake checkpoint that causes the SYN/SYN-ACK traffic for each iteration of the parent. Since the parent itself is not live, the parent pattern's data being transmitted over the network is not typically seen. After the TCP handshake is completed, the children are generated with auto-sequence numbers. Note that child C is referencing data in the parent, specifically the Z function.

TABLE 40

(not live) 3WAY-PARENT [A] [A] [Auto TCP Sequence] [Z *3]
CHILD [B] [Auto TCP Sequence] [HELLO]
CHILD [C] [Auto TCP Sequence] [PARENT -> Z]
CHILD [D] [TCP Sequence] [WORLD]
results in the following network output:
   (A A) SYNC ->
   (A A) <- SYNC ACK
   (A A) -> ACK
     B 1 HELLO
       C 6 Z0
   D 8 WORLD
     (A A) SYNC ->
     (A A) <- SYNC ACK
     (A A) -> ACK
   B 1 HELLO
   C 6 Z1
   D 8 WORLD
     (A A) SYNC ->
     (A A) <- SYNC ACK
     (AA) -> ACK
   B 1 HELLO
   C 6 Z2
   D 8 WORLD
     (A A) SYNC ->
     (A A) <- SYNC ACK
     (A A) -> ACK
   B 1 HELLO
   C 6 Z3
   D 8 WORLD Table 41 lists generated patterns having a parent pattern with a 3-Way Handshake with Buffer Test with Reference.

TABLE 41

(not live) 3WAY-PARENT [A] [A] [Auto TCP Sequence] [BUFFER_TEST 5-10]
CHILD [B] [Auto TCP Sequence] [PARENT->BUFFER_TEST]
CHILD [C] [Auto TCP Sequence] [WORLD]
results in the following network output:
   (A A) SYNC ->
   (A A) <- SYNC ACK
   (A A) -> ACK
   B 1 HELLOAAAAA
   C 11 WORLD
     (A A) SYNC ->
     (A A) <- SYNC ACK
     (A A) -> ACK
   B 1 HELLOAAAAAA
   C 12 WORLD
     (A A) SYNC ->
     (A A) <- SYNC ACK
     (A A) -> ACK
   B 1 HELLOAAAAAAA
   C 13 WORLD
     (A A) SYNC ->
     (A A) <- SYNC ACK
     (A A) -> ACK
   B 1 HELLOAAAAAAAA
   C 14 WORLD
     (A A) SYNC ->
     (A A) <- SYNC ACK
     (A A) -> ACK
   B 1 HELLOAAAAAAAAA
   C 15 WORLD
     (A A) SYNC ->
     (A A) <- SYNC ACK
     (A A) -> ACK
   B 1 HELLOAAAAAAAAAA
   C 16 WORLD Fault Detection FIG. 1200 is a state diagram 1200 illustrating a fault detection method according to an embodiment of the invention. In state 1205, the target system (i.e., system-under-test) waits for a transaction from the network. The transaction may be sent across the network by, for example, the testing unit 105 (FIG. 1). In state 1210, parsing is performed on the received transaction. Based on the results of the parsing in state 1210, a fault condition (e.g., a program crash) may occur as shown in state 1215, or a non-fault condition may occur as shown in state 1220. If the fault condition of state 1215 occurs, then the target system may perform a reset as shown in state 1225. The testing unit 105 can then detect the reset occurrence in state 1225 to detect the fault occurrence.

If the non-fault condition of state 1220 occurs, then the target system will be in a no-fault state 1230, before the target system resets as shown in state 1235.

Typically, for fault injection methods based on extraneous meta-characters and buffer-overflow fault injector, detection is made for a reset to determine fault occurrence.

Figure 13:
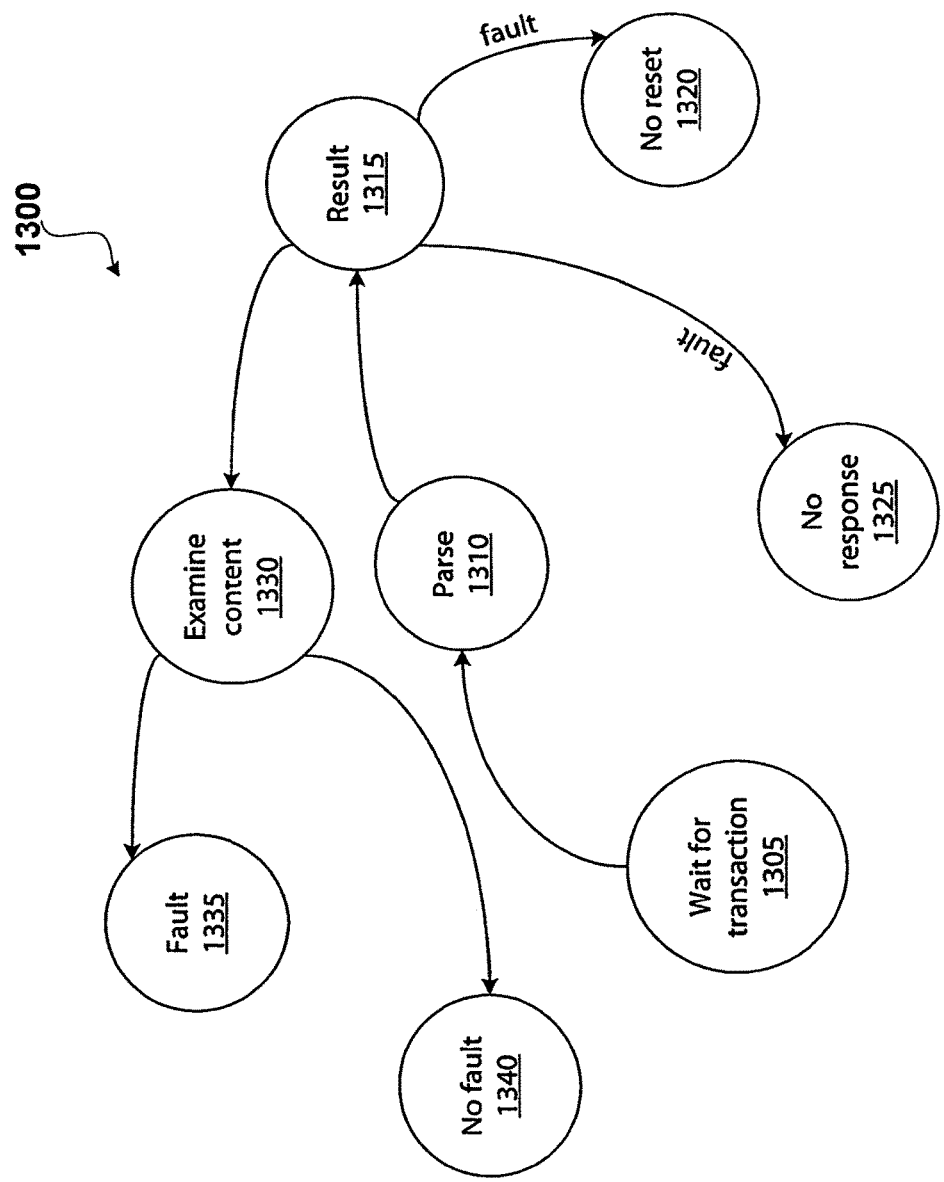
FIG. 13 is a state diagram illustrating a fault detection method according to another embodiment of the invention.

FIG. 13 is a state diagram 1300 illustrating a fault detection method according to an embodiment of the invention. In state 1305, the target system (i.e., system-under-test) waits for a transaction from the network. In state 1310, parsing is performed on the received transaction. Based on the results of the parsing in state 1310, a fault condition (e.g., a program crash) may occur as shown in state 1335, state 1320, and state 1325. If the fault condition in state 1315 occurs, then the target system may send return data to the testing unit 105, and the return data can be examined (state 1330) to determine whether there was a fault occurrence (state 1335) or no fault occurrence (state 1340). For example, if examination of the return data indicates, among others, too many records in the data base, or content for a file of another user, or a deleted hard drive with no data, then a fault occurrence can be detected. Typically, for fault injections based on the input field injection method, the content of the return data is examined to determine a fault occurrence.

A fault occurrence in state 1315 may also result in a non-reset by the target system, as shown in state 1320. This non-reset condition allows the testing unit 105 to detect a fault occurrence.

A fault occurrence in state 1315 may also result in a non-response by the target system, as shown in state 1325. This non-response condition allows the testing unit 105 to detect a fault occurrence.

Creating IDS Signature & Conversion to Regular Expression

Figure 14:
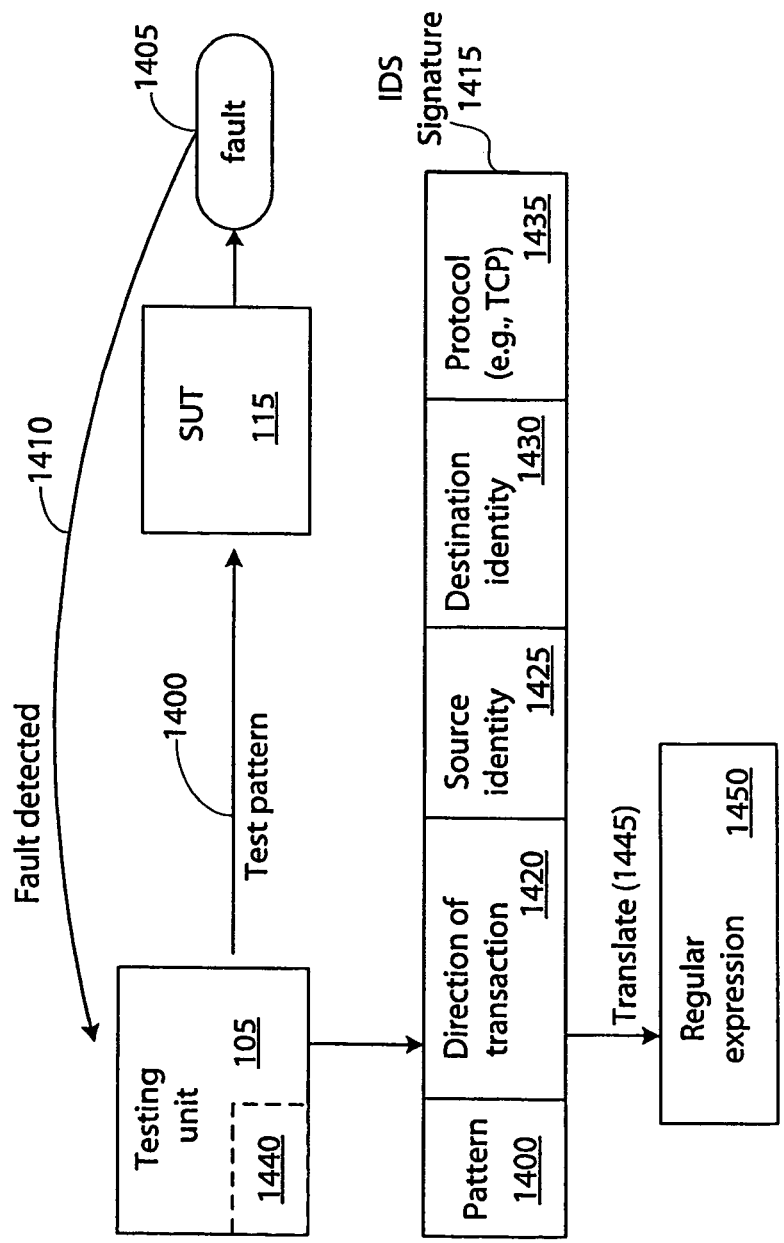
FIG. 14 is a block diagram illustrating a method of creating an IDS signature after a fault occurrence is detected.

FIG. 14 is a block diagram showing a method of creating an IDS signature after a fault occurrence is detected. Assume that a test pattern 1400 is transmitted by the testing unit 105 across the network to the system-under-test 115. If a fault condition 1405 occurs in response to the test pattern 1400, then feedback 1410 permits the testing unit 105 to detect the fault condition 1405.

In one embodiment, based on the fault condition 1405, the testing unit 105 can create an IDS signature 1415 based on, for example, at least some of the following known information: (1) test pattern 1400; (2) direction 1420 of the transaction that caused the fault condition 1405; (3) transaction source identity 1425; (4) transaction destination identity 1430; (5) Protocol 1435 (e.g., TCP). A parser 1440 in the testing unit 105 can then translate (1445) the IDS signature 1415 into a regular expression 1450. The regular expression 1450 is useful by being able to provide a more generic expression or broader definition of strings of data that define the parameters that caused a fault condition 1405 or problematic transaction. Regular expressions can be a powerful tool for manipulating text and data. For example, regular expressions can play a vital role in constructing a World Wide Web CGI script, which can involve text and data of all sorts. Additional details on regular expression may be found in, for example, Jeffrey E. F. Friedl, MASTERING REGULAR EXPRESSIONS: POWERFUL TECHNIQUES FOR PERL AND OTHER TOOLS, 1st Edition, (O'Reilly Books January 1997). The reference, MASTERING REGULAR EXPRESSIONS: POWERFUL TECHNIQUES FOR PERL AND OTHER TOOLS, is fully incorporated herein by reference.

Conversion of a Pattern to Arbitrary Expression for Intrusion Detection

The pattern from the testing unit 105 represents an abstract description of a network transaction 130. An intrusion detection equipment that operate on "signatures" are driven by expressions that describe network transactions 130. Thus, there is a conversion possible between a pattern from the testing unit 105 and a "signature" expression.

The format of an IDS signature expression is typically proprietary—but is usually very similar to a standard regular expression. For example, a signature expression to detection of the character-string "/etc/passwd" in a network transaction might look like as shown in Table 42:

TABLE 42

MATCH: TCP, */etc/passwd*

This expression would indicate that all 'TCP' transactions are to be examined for any character text that includes the substring "etc/passwd". The use of the asterisks indicates matching behavior. In this example, the asterisk indicates a rule of "MATCH ANYTHING". Thus, the entire expression says "MATCH ANYTHING" followed by "/etc/passwd/" which is followed by "MATCH ANYTHING". Thus, any string of any format that contains the substring "/etc/passwd" will cause this expression to trigger.

A pattern describes all portions of a transaction in the context of a network protocol. A pattern may be using the substring "/etc/passwd". The pattern is a TCP transaction, and this fact can be used to generate the network-protocol specific information for the IDS signature as shown in Table 43:

TABLE 43

MATCH: TCP

The application-layer portions of the IDS signature can be obtained from the pattern as well. The following string is inserted in an HTTP GET request:

TABLE 44

GET /cgi-bin/campas?%0A/etc/passwd/%0A

This string in Table 44 contains the substring "/etc/passwd". The pattern represents the entire set of data which is meaningful for the construction of an IDS signature. By using meta-characters as delimiters in the string (such as space and %0A), the pattern can be sliced into substrings as shown in Table 45:

TABLE 45

GET
GET /cgi-bin/campas
/cgi-bin/campas
/etc/passwd/

Valid IDS signatures that match this pattern can be generated in several ways, as shown in Table 46:

TABLE 46

MATCH: TCP, GET*
MATCH: TCP, GET /cgi-bin/campas*
MATCH: TCP, */cgi-bin/campas*
MATCH: TCP, */etc/passwd/*

What is novel about the above process is that we can:
(1) Use the pattern to attack a given SUT;
(2) Discover a fault in the SUT that relates to a transaction produced by the pattern;
(3) Convert the pattern into an IDS signature that can detect the fault-producing transaction;
(4) The IDS signature can now be deployed to help mitigate the risk of the fault occurring.

The patterns encode the knowledge about which portions of the transaction are being injected with fault and which portions are string literals—not actually part of the fault injection but required for a valid transaction.

The pattern encodes several text fields and a special field that is labeled "BUFFER". The 'BUFFER' field is a part of the pattern and it has a position in relation to the text fields around it. The transactions produced by this pattern will contain the following strings as shown in Table 47:

TABLE 47

GET /cgi-bin/test?AAAAAAAAAAAA HTTP/1.1
GET /cgi-bin/test?AAAAAAAAAAAAAA HTTP/1.1
GET /cgi-bin/test?AAAAAAAAAAAAAAAA HTTP/1.1
GET /cgi-bin/test?AAAAAAAAAAAAAAAAAA HTTP/1.1
GET /cgi-bin/test?AAAAAAAAAAAAAAAAAAAA HTTP/1.1

Here we see several iterations of transactions produced from the illustrated pattern. The "AAAAA" part of the string is produced by the "BUFFER" field in the pattern. As we can see, several different sizes of buffer are being injected into the transaction. Because the "BUFFER" field is the dynamic and changing part of the transaction, it can be considered the injected part. The injected part is the most important when crafting an IDS signature. If the first transaction above produces a fault, but the second does not—then a specific IDS signature can be crafted for the faulty transaction:

TABLE 48

MATCH: TCP, */cgi-bin/test? [A X 11]*

The rules for formatting the expression may differ depending on the regular-expression syntax being employed by the IDS system, but in this example, the [A×11] indicates that eleven "A" characters should follow the string "/cgi-bin/test?". Thus, only the first transaction listed above will match the expression.

Since the letter "A" is chosen arbitrarily, the IDS signature can be generated based on character-class, such as the following:

TABLE 49

MATCH: TCP, */cgi-bin/test?[. X 11]*

For this example, the [.×11] means match ANY character, as long as eleven of them appear. This would allow the signature to match other transactions that do not contain "A", but which may be able to produce the same fault.

The pattern encodes data for all fields and the delimiters between fields. That is, the pattern encodes spaces and special characters that mark the boundary between fields. To restrict an IDS signature to match only a given field, the delimiter characters around a field can be included in the expression:

TABLE 50

MATCH: TCP, *' /cgi-bin/test?[. X 11] '*

In this expression, the space characters are included at the beginning and end of the single-quoted string. It is noted here that the combination of characters encoded in the pattern, coupled with the knowledge of which parts of the transaction are being injected, leads to a more intelligent signature expression.

Other variations and modifications of the above-described embodiments and methods are possible in light of the foregoing teaching.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. A method of creating a fault-inducing transaction representation in a network, the method comprising:
    interjecting a pattern with fault-inducing sub-fields, where the pattern is an expression including a literal string and a wildcard character class; and
    using the expression, of the pattern, to form a plurality of subsequent expressions that can be used by a target system to detect and trigger on the network at least one transaction that matches the expression, wherein said using the expression comprises providing a grammar injection into the expression and providing a value injection into the expression, in order to form the plurality of subsequent expressions;
    wherein the expression comprises value fields and a delimiter between the value fields;
    wherein the grammar injection comprises modifying an order, a structure, and a character of the value fields and delimiter in the expression;
    wherein the value injection comprises modifying an input field value in the expression;
    wherein the plurality of subsequent expressions comprises a plurality of mutations of the pattern;
    wherein the transaction is used to test for vulnerabilities in the target system.

2. An article of manufacture, comprising:
    a computer-readable medium having stored thereon instructions to:
    interject a pattern with fault-inducing sub-fields, where the pattern is an expression including a literal string and a wildcard character class; and
    use the expression, of the pattern, to form a plurality of subsequent expressions that can be used by a target system to detect and trigger on the network at least one transaction that matches the expression, wherein the plurality of subsequent expressions comprises a plurality of mutations of the pattern, wherein said use of the expression comprises providing a grammar injection into the expression and providing a value injection into the expression, in order to form the plurality of subsequent expressions;
    wherein the expression comprises value fields and a delimiter between the value fields;
    wherein the grammar injection comprises modifying an order, a structure, and a character of the value fields and delimiter in the expression;
    wherein the value injection comprises modifying an input field value in the expression.

3. An apparatus for creating a fault-inducing transaction representation in a network, the apparatus comprising:
    means for interjecting a pattern with fault-inducing sub-fields, where the pattern is an expression including a literal string and a wildcard character class; and
    coupled to the interjecting means, means for using the expression, of the pattern, to form a plurality of subsequent expressions that can be used by a target system to detect and trigger on the network at least one transaction that matches the expression, wherein the plurality of subsequent expressions comprises a plurality of mutations of the pattern, wherein said means for using the expression comprises means for providing a grammar injection into the expression and means for providing a value injection into the expression, in order to form the plurality of subsequent expressions;

wherein the expression comprises value fields and a delimiter between the value fields;

wherein the grammar injection comprises modifying an order, a structure, and a character of the value fields and delimiter in the expression;

wherein the value injection comprises modifying an input field value in the expression.

4. A method of testing a target in a network by fault injection, the method comprising:

defining a transaction baseline including an order and a structure;

modifying at least one of an order and a structure of the transaction baseline with an expression to obtain a plurality of modified transactions, wherein each of the modified transactions comprises a respective malformed grammar, wherein the expression comprises value fields and a delimiter between the value fields;

wherein the modifying includes modifying an order, a structure, and a character of the value fields and delimiter in the expression;

wherein said modifying the order, the structure, and the character of the value fields and delimiter comprises providing a grammar injection into the transaction baseline in order to modify the transaction baseline; and transmitting the modified transaction to a target.

5. The method of claim 4, further comprising:

after transmitting the modified transaction, receiving a feedback from the target to determine fault occurrence.

6. The method of claim 4 wherein the modifying step comprises:

providing alternative character encoding for a character in the transaction baseline.

7. The method of claim 4 wherein the modifying step comprises:

removing a field from the transaction.

8. The method of claim 4 wherein the modifying step comprises:

duplicating a field in the transaction.

9. The method of claim 4 wherein the modifying step comprises:

creating a double delimiter in the transaction.

10. The method of claim 4 wherein the modifying step comprises:

sending all delimiters in the transaction.

11. The method of claim 4 wherein the modifying step comprises:

sending a blank transaction with no values in the transaction.

12. The method of claim 4 wherein the modifying step comprises:

sending a single character and delimiter-value pair at a repeated large buffer in the transaction.

13. The method of claim 4 wherein the modifying step comprises:

sending an unbalanced pair in the transaction.

14. The method of claim 4 wherein the modifying step comprises:

replacing a delimiter with random ranges that cover the value of the delimiter.

15. The method of claim 4 wherein the modifying step comprises:

using an alternative encoding to encode a transaction field with a character that is equal in nature and different in representation.

16. The method of claim 4 wherein the modifying step comprises:

using prefixed escapes in the transaction.

17. The method of claim 4 wherein the modifying step comprises:

using value injection to alter an input field in the transaction.

18. The method of claim 4 wherein the modifying step comprises:

using ghost character encoding in the transaction.

19. The method of claim 4 wherein the modifying step comprises:

determining a value injection based on numerical ranges of the input field content.

20. The method of claim 4 wherein the modifying step comprises:

controlling a user identity which is a field indicating resource name or user identity.

21. The method of claim 4 wherein the modifying step comprises:

injecting unfiltered metacharacters to a secondary process.

22. The method of claim 4 wherein the modifying step comprises:

using extraneous meta-characters for causing misclassification.

23. The method of claim 4 wherein the modifying step comprises:

parsing out a delimiter to obtain an intermediate representation of the transaction, where a value in the transaction is replaced by a buffer function.

24. A method of testing a target on a network by fault injection, the method comprising:

defining a transaction baseline including an input field;

modifying the input field in the transaction baseline to obtain a plurality of modified transactions with malformed value, wherein said modified transactions comprise permutations of the input field in the transaction baseline and iterations of the input field in the transaction baseline, wherein modifying the input field in the transaction baseline includes providing a ghost character in the transaction baseline, wherein the ghost character does not affect the validity of the transaction; and transmitting the modified transactions to a target.

25. A method of fault detection in a target in a network, the method comprising:

parsing a received transaction which is formed by a modification of a transaction baseline;

wherein said modification of the transaction baseline comprises providing a grammar injection into the transaction baseline and providing a value injection into the transaction baseline;

wherein the transaction baseline comprises value fields and a delimiter between the value fields;

wherein the grammar injection comprises modifying an order, a structure, and a character of the value fields and delimiter in the transaction baseline;

wherein the value injection comprises modifying an input field value in the transaction baseline; and in response to the received transaction, detecting for a fault condition by detecting for at least one of a non-reset condition in the target, errors in a return data from the target, and non-response from the target.

26. An apparatus for fault detection in a target in a network, the apparatus comprising:

a parser configured to parse a received transaction which is formed by a modification of a transaction baseline; wherein said modification of the transaction baseline comprises providing a grammar injection into the transaction baseline and providing a value injection into the transaction baseline;
wherein the transaction baseline comprises value fields and a delimiter between the value fields;
wherein the grammar injection comprises modifying an order, a structure, and a character of the value fields and delimiter in the transaction baseline;
wherein the value injection comprises modifying an input field value in the transaction baseline; and
a testing unit coupled to the parser via the network and configured to detect for a fault condition by detecting for at least one of a non-reset condition in the target, errors in a return data from the target, and non-response from the target, wherein the testing unit includes a network interface configured to transmit and receive network traffic.

27. A method of creating an intrusion detection system (IDS) signature from a pattern, the method comprising:
using a pattern for causing a fault in a target, wherein the pattern comprises text fields and an injected part, and wherein the injected part comprises different sizes and different values for different iterations of a transaction created by the pattern;
wherein the pattern is formed from a transaction baseline;
wherein said transaction baseline comprises value fields and a delimiter between the value fields;
wherein the injected part is formed by modifying an order, a structure, and a character of the value fields and delimiter in the transaction baseline and is also formed by modifying an input field value in the transaction baseline;
discovering a fault occurrence in the target due to a transaction created by the pattern; and
converting the pattern into an IDS signature that can detect a fault-producing transaction.

28. An article of manufacture, comprising:
a computer-readable medium having stored thereon instructions to:
use a pattern for causing a fault in a target, wherein the pattern comprises text fields and an injected part, and wherein the injected part comprises different sizes and different values for different iterations of a transaction created by the pattern;
wherein the pattern is formed from a transaction baseline;
wherein said transaction baseline comprises value fields and a delimiter between the value fields;
wherein the injected part is formed by modifying an order, a structure, and a character of the value fields and delimiter in the transaction baseline and is also formed by modifying an input field value in the transaction baseline;
discover a fault occurrence in the target due to a transaction created by the pattern; and
convert the pattern into an intrusion detection system (IDS) signature that can detect a fault-producing transaction.

29. An apparatus for creating an intrusion detection system (IDS) signature from a pattern, the apparatus comprising:
means for using a pattern for causing a fault in a target, wherein the pattern comprises text fields and an injected part, and wherein the injected part comprises different sizes and different values for different iterations of a transaction created by the pattern;
wherein the pattern is formed from a transaction baseline;
wherein said transaction baseline comprises value fields and a delimiter between the value fields;
wherein the injected part is formed by modifying an order, a structure, and a character of the value fields and delimiter in the transaction baseline and is also formed by modifying an input field value in the transaction baseline;
coupled to the using means, means for discovering a fault occurrence in the target due to a transaction created by the pattern; and
coupled to the discovering means, means for converting the pattern into an IDS signature that can detect a fault-producing transaction.

* * * * *